United States Patent
Chalfin et al.

(10) Patent No.: US 11,216,993 B2
(45) Date of Patent: Jan. 4, 2022

(54) GRAPHICS PROCESSING SYSTEMS

(71) Applicant: Arm Limited, Cambridge (GB)

(72) Inventors: Alexander Eugene Chalfin, Mountain View, CA (US); Andreas Due Engh-Halstvedt, Trondheim (NO); Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/697,903

(22) Filed: Nov. 27, 2019

(65) Prior Publication Data

US 2021/0158584 A1   May 27, 2021

(51) Int. Cl.
    *G06T 11/20*    (2006.01)
    *G06T 1/20*     (2006.01)
    *G06T 1/60*     (2006.01)

(52) U.S. Cl.
    CPC .............. *G06T 11/20* (2013.01); *G06T 1/20* (2013.01); *G06T 1/60* (2013.01)

(58) Field of Classification Search
    CPC ...................................... G06T 11/20
    USPC ........................................ 345/441
    See application file for complete search history.

(56) References Cited

U.S. PATENT DOCUMENTS

| | | |
|---|---|---|
| 6,552,723 B1 | 4/2003 | Duluk, Jr. et al. |
| 6,567,092 B1 | 5/2003 | Bowen |
| 6,943,797 B2 | 9/2005 | Wasserman et al. |
| 7,126,606 B2 | 10/2006 | Beda et al. |
| 7,439,979 B1 | 10/2008 | Allen et al. |
| 7,843,463 B1 | 11/2010 | Kilgard |
| 7,852,340 B2 | 12/2010 | Bastos et al. |
| 7,928,988 B1* | 4/2011 | Levas .............. G06T 15/04 345/537 |
| 7,978,205 B1 | 7/2011 | Patel et al. |
| 8,040,351 B1* | 10/2011 | Diard ............... G06T 17/00 345/426 |
| 8,207,975 B1 | 6/2012 | Molnar et al. |
| 9,208,605 B1* | 12/2015 | Everitt ............. G06T 15/50 |
| 9,830,741 B2 | 11/2017 | Kilgariff et al. |

(Continued)

FOREIGN PATENT DOCUMENTS

WO   2009068895   6/2009

OTHER PUBLICATIONS

Chalfin, et al., "Graphics Processing Systems," U.S. Appl. No. 16/697,942, filed Nov. 27, 2019.

(Continued)

*Primary Examiner* — Javid A Amini
(74) *Attorney, Agent, or Firm* — Vierra Magen Marcus LLP

(57) ABSTRACT

When processing graphics primitives in a graphics processing system, the render output is divided into a plurality of regions for rendering, each region comprising a respective area of the render output. It is determined for which of the plurality of regions of the render output a primitive should be rendered for. Primitive data for rendering the primitive is then stored either in a combined data structure in memory that is associated with a plurality of different regions of the render output, or is stored in a respective data structure for each region of the render output it is determined the primitive should be rendered for. Which manner the primitive data is stored is determined in dependence on a property, e.g. a coverage, of the primitive.

21 Claims, 7 Drawing Sheets

(56) References Cited

U.S. PATENT DOCUMENTS

| | | |
|---|---|---|
| 2002/0126127 A1 | 9/2002 | Fox |
| 2004/0012563 A1 | 1/2004 | Papakipos et al. |
| 2004/0130552 A1* | 7/2004 | Duluk, Jr. ............. G06T 15/005 345/506 |
| 2004/0263520 A1 | 12/2004 | Wasserman et al. |
| 2007/0257905 A1 | 11/2007 | French et al. |
| 2009/0174706 A1 | 7/2009 | Howson |
| 2009/0295804 A1 | 12/2009 | Goel et al. |
| 2010/0177105 A1* | 7/2010 | Nystad .................... G06T 11/40 345/522 |
| 2012/0206653 A1 | 8/2012 | Graves et al. |
| 2013/0002663 A1* | 1/2013 | Howson .................... G06T 1/20 345/419 |
| 2015/0015593 A1 | 1/2015 | Chalfin |
| 2015/0310642 A1* | 10/2015 | Kruglick ................. G06F 15/16 345/441 |
| 2015/0379658 A1* | 12/2015 | Gyota ....................... G06T 1/60 345/441 |
| 2016/0203144 A1 | 7/2016 | Yao et al. |
| 2016/0217550 A1 | 7/2016 | Lu et al. |
| 2017/0124748 A1 | 5/2017 | Ellis |
| 2017/0309027 A1 | 10/2017 | Kleen et al. |
| 2018/0130253 A1 | 5/2018 | Hazel |
| 2018/0232912 A1 | 8/2018 | Nevraev et al. |
| 2018/0300915 A1 | 10/2018 | Heggelund |
| 2019/0012829 A1 | 1/2019 | Engh-Halstvedt et al. |
| 2019/0243652 A9* | 8/2019 | Hakura ................. G06T 15/405 |
| 2020/0074713 A1 | 3/2020 | Schluessler et al. |
| 2020/0202484 A1* | 6/2020 | Brigg .................... G06T 11/40 |
| 2020/0334889 A1* | 10/2020 | Rollingson ........... G06T 15/005 |

OTHER PUBLICATIONS

Bratt, et al., "Graphics Processing Systems," U.S. Appl. No. 16/697,984, filed Nov. 27, 2019.
Chalfin, et al., "Graphics Processing Systems," U.S. Appl. No. 16/698,030, filed Nov. 27, 2019.
Non-Final Office Action dated Nov. 5, 2020, U.S. Appl. No. 16/697,942.
Isenberg, et al., "Compressing Polygon Mesh Geometry with Parallelogram Prediction," Visualization Conference, Dec. 2002 DOI: 10.1109/VISUAL.2002.1183768.
Non-Final Office Action dated Dec. 11, 2020, U.S. Appl. No. 16/698,030.
Non-Final Office Action dated Jan. 28, 2021, U.S. Appl. No. 16/697,984.
Response to Final Office Action dated Sep. 28, 2021, U.S. Appl. No. 16/698,030.
Response to Non-Final Office Action dated Mar. 4, 2021, U.S. Appl. No. 16/697,942.
Response to Non-Final Office Action dated Mar. 11, 2021, U.S. Appl. No. 16/698,030.
Final Office Action dated Apr. 2, 2021, U.S. Appl. No. 16/697,942.
Response to Non-Final Office Action dated Apr. 28, 2021, U.S. Appl. No. 16/697,984.
Final Office Action dated May 17, 2021, U.S. Appl. No. 16/698,030.
Response to Final Office Action dated Jun. 21, 2021, U.S. Appl. No. 16/697,942.
Notice of Allowance dated Aug. 2, 2021, U.S. Appl. No. 16/697,984.
Notice of Allowance dated Aug. 25, 2021, U.S. Appl. No. 16/697,942.
Combined Search and Examination Report dated Aug. 31, 2021, GB Patent Application No. 2018208.5.

* cited by examiner

GRAPHICS PROCESSING SYSTEMS

BACKGROUND

The technology described herein relates to computer graphics processing and in particular to the processing of graphics primitives during the rendering of an output.

Graphics processing is normally carried out by first dividing the graphics processing (render) output to be rendered, such as a frame to be displayed, into a number of similar basic components (so-called "primitives") to allow the graphics processing operations to be more easily carried out. These "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices. For a given frame, there may, e.g., be of the order of a few hundred draw calls, and hundreds of thousands of primitives.

Once primitives and their vertices have been generated and defined, they can be processed by the graphics processing system, in order to generate the desired graphics processing output (render target), such as a frame for display. This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively. (The term "rasterisation" is sometimes used to mean both primitive conversion to sample positions and rendering. However, herein "rasterisation" will be used to refer to converting primitive data to sampling point addresses only.)

The rasterising and rendering processes use the vertex attributes associated with the vertices of the primitives that are being processed. To facilitate this operation, the attributes of the vertices defined for the given graphics processing output (e.g. draw call) are usually subjected to an initial so-called "vertex shading" operation, before the primitives are rasterised and rendered. This "vertex shading" operation operates to transform the attributes for each vertex into a desired form for the subsequent graphics processing operations. This may comprise, for example, transforming vertex position attributes from the world or user space that they are initially defined for to the screen space that the output of the graphics processing system is to be displayed in.

A graphics processing pipeline will typically therefore include a vertex shading stage (a vertex shader) that executes vertex shading computations on the initial vertex attribute values defined for the vertices so as to generate a desired set of output vertex attributes (i.e. appropriately "shaded" attributes) for use in subsequent processing stages of the graphics processing pipeline.

Once the vertex attributes have been shaded, the "shaded" attributes are then used when processing the vertices (and the primitives to which they relate) in the remainder of the graphics processing pipeline.

One form of graphics processing uses so-called "tile-based" rendering. In tile-based rendering, the two-dimensional render output (i.e. the output of the rendering process, such as an output frame to be displayed) is rendered as a plurality of smaller area regions, usually referred to as "tiles". In such arrangements, the render output is typically divided (by area) into regularly-sized and shaped rendering tiles (they are usually e.g., squares or rectangles). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

In a tile-based graphics processing pipeline, the geometry (primitives) for the render output being generated is sorted into regions of the render output area, so as to allow the geometry (primitives) that need to be processed for each rendering tile to be identified. This sorting allows primitives that need to be processed for a given rendering tile to be identified (so as to, e.g., avoid unnecessarily rendering primitives that are not actually present in a tile). The sorting process produces lists of primitives to be rendered for regions of the render output (commonly referred to as "primitive lists"). Once the primitive lists have been prepared for all the render output regions, each rendering tile is processed, by rasterising and rendering the primitives listed for the rendering tile.

The process of preparing primitive lists for each render output region basically therefore involves determining the primitives that should be rendered for a given render output region. This process is usually carried out by determining (at a desired level of accuracy) the primitives that intersect (i.e. that will appear (at least in part) within) the render output region in question, and then preparing a list of those primitives for future use by the graphics processing system.

It should be noted here that where a primitive falls into more than one render output region, as will frequently be the case, it is included in the primitive list for each region that it falls within. A render output region for which a primitive list is prepared could be a single rendering tile, or a group of plural rendering tiles, etc.

In effect, each render output region can be considered to have a bin (the primitive list) into which any primitive that is found to fall within (i.e. intersect) the region is placed (and, indeed, the process of sorting the primitives on a region-by-region basis in this manner is commonly referred to as "binning").

It is known to implement the binning in a hierarchical fashion, using various different region sizes (levels in the hierarchy), e.g. going down to the rendering tile size (the lowest level). However, the binning may be performed in a more or less sophisticated manner, as desired.

Thus, in a tile-based processing system there will be an initial processing pass which, in effect, sorts the graphics primitives (and/or other graphics entities, geometry, etc.) to be processed into regions that the render output has been divided into for sorting purposes.

The tiles are then each rendered separately, and the rendered tiles are then recombined to provide the complete render output (e.g. frame for display). The rendering of a primitive for a tile is generally performed using a set of geometry data representing the primitive as well as state data indicative of the operations to be performed when rendering the primitive.

In a tile-based rendering system the primitive lists thus reflect the spatial distribution of the primitives in the render output, i.e. by specifying which primitives should be rendered for which regions/tiles. All of the geometry data for the render output is thus stored together in memory in a data structure for the render output, and the relevant primitive data for rendering a tile is obtained from this data structure by reference to the primitive lists. Any state data is then stored in a further data structure.

The Applicants believe there remains scope for providing alternative, improved graphics processing systems.

BRIEF DESCRIPTION OF THE DRAWINGS

Various embodiments will now be described, by way of example only, and with reference to the accompanying drawings in which.

Like reference numerals are used for like elements in the drawings as appropriate.

DETAILED DESCRIPTION

Figure 1:
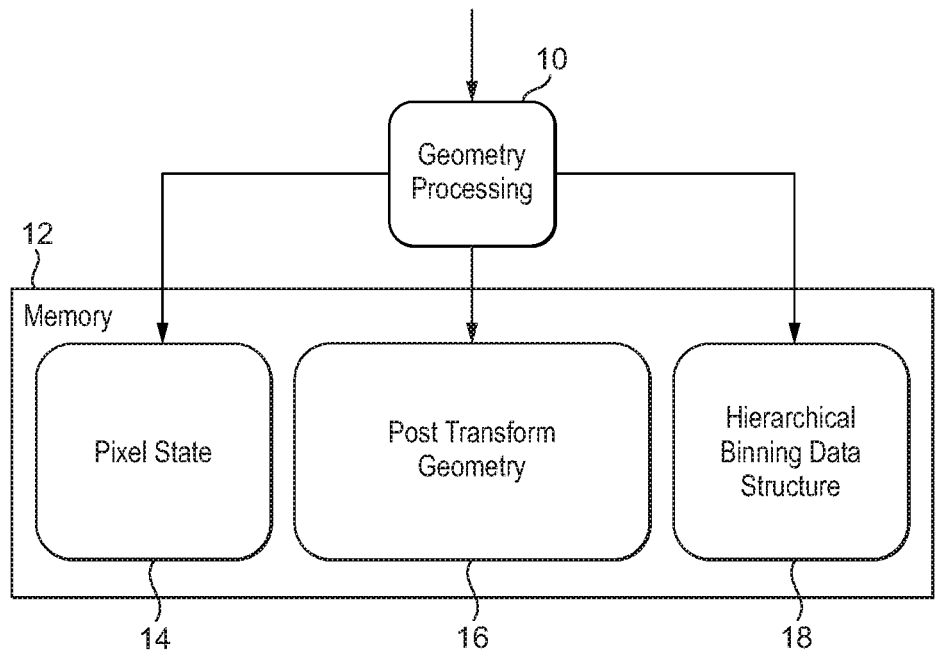
FIGS. 1, 2 and 3 schematically illustrate the operation of a traditional tile-based graphics processing system.

A first embodiment of the technology described herein comprises a method of processing graphics primitives using a graphics processing system comprising a memory system and a graphics processor in communication with the memory system, wherein the graphics processor is configured to generate a render output by rendering a plurality of primitives for the render output, wherein primitives are rendered by the graphics processor using associated primitive data for the primitives, and wherein the render output is divided into a plurality of regions for rendering, each region comprising a respective area of the render output, the method comprising:

for a set of one or more primitive(s) that is to be rendered:

determining for which of the plurality of regions into which the render output has been divided for rendering the set of one or more primitive(s) should be rendered for; and in dependence on a property of the set of one or more primitive(s) either storing associated primitive data for rendering the set of one or more primitive(s) in a combined data structure in memory that is associated with a plurality of different regions of the render output, or storing the associated primitive data for rendering the set of one or more primitive(s) in a respective data structure for each region of the render output it is determined the set of one or more primitive(s) should be rendered for.

A second embodiment of the technology described herein comprises a graphics processing system comprising a memory system and a graphics processor in communication with the memory system, wherein the graphics processor is configured to generate a render output by rendering a plurality of primitives for the render output, wherein primitives are rendered by the graphics processor using associated primitive data for the primitives, and wherein the render output is divided into a plurality of regions for rendering, each region comprising a respective area of the render output, the graphics processor comprising:

a primitive sorting circuit that is configured to:

for a set of one or more primitive(s) that is to be rendered:

determine for which of the plurality of regions into which the render output has been divided for rendering the set of one or more primitive(s) should be rendered for; and a primitive storing circuit that is configured to:

in dependence on a property of the set of one or more primitive(s), either store associated primitive data for rendering the set of one or more primitive(s) in a combined data structure in memory that is associated with a plurality of regions of the render output, or store the associated primitive data for rendering the set of one or more primitive(s) in a respective data structure for each region of the render output it is determined the set of one or more primitive(s) should be rendered for.

In the technology described herein, the render output (which may, e.g., comprise at least a part of a frame to be displayed) is divided into a plurality of regions for rendering with each region including a respective area of the render output. The graphics primitives (which in an embodiment are initially defined by and represented as a set of vertices for each primitive) for the render output are then obtained and processed, e.g. in the usual fashion, in order to determine associated primitive data for the primitives in a form that can be used by the graphics processor to render the primitives.

In embodiments the associated primitive data for rendering the primitive (or a set of primitives) comprises geometry data for the primitive(s) (e.g. which geometry data may, and in an embodiment does, comprise a group of transformed, or "shaded", vertices for each of the primitives). The geometry data may, e.g., be obtained from a vertex shading circuit of the graphics processor. The graphics processor then uses the associated geometry data (which may, e.g., comprise such transformed geometry data) for a primitive (or set of primitives) when rendering the primitive(s).

An indication of associated state (control) data that may be required for rasterising and/or rendering the primitive(s) is in an embodiment also stored along with the geometry data. This state data may, e.g., be defined, for groups of plural primitives, e.g., per draw call (and shared by and used for all the primitives in the group, e.g. draw call, in question).

Each primitive (or set of primitives) is in an embodiment thus rendered using the associated geometry data representing the primitive and state data indicative of the operations to be performed when rendering the primitive.

In order to allow for a more efficient use of available memory space the Applicants have recognised that it may be desirable to organise and store the associated primitive (e.g. geometry) data for at least some of the primitives that are received to be processed on a "per region" basis, with the primitive data for any primitives that need to be rendered for a particular render output region being stored in an associated data structure for that region (such that where a primitive falls into multiple different regions, the associated primitive data is duplicated and a copy of the primitive data for the primitive is stored in the respective data structures for each region).

Thus, once the associated primitive data for a primitive (or set of primitives that are to be processed together) has been obtained, it is then determined for which region(s) of the render output the primitive(s) should be rendered for. This is in an embodiment done by checking which of the regions of the render output are at least partially covered by the primitive(s) in question. The primitive data can then be written into the appropriate data structures accordingly.

However, the Applicants have also recognised that rather than storing the associated primitive data for each and every primitive (or set of primitives) that is received to be processed in such "per region" data structures, i.e. such that primitive data is stored in individual data structures associated with each respective, different region of the render output, it may be more efficient and a better use of available resource to instead store primitive data for some of the primitives (or sets of primitives) in a separate, "combined" data structure that is allocated for a plurality of regions of the render output. In particular, in embodiments, the "combined" data structure is allocated for the entire render output (and which may therefore contain primitive data for any (and all) of the regions of the render output, as opposed to the "per region" data structures which contain primitive data for the respective region only).

Thus, according to the technology described herein, in combination with the storing of the associated primitive data for rendering the primitives in respective "per region" data structures that are allocated for different regions of the render output, some of the primitive data can be (and is) stored in a separate "combined" data structure that is associated with a larger area of the render output (and in an embodiment associated with the entire render output).

In the technology described herein, the associated primitive data for rendering a primitive may thus either be stored on a "per region" basis, i.e. by determining which render output regions the primitive should be rendered for, and then storing the primitive data in respective data structures for each region that it has been determined the primitive should be rendered for, or on a more "global" basis in a combined data structure that is associated with a plurality of regions of the (and in an embodiment the entire) render output.

Thus, for a group of plural primitives that are received to be processed (e.g. in a draw call), primitive data for some of the primitives in the group may be stored in respective "per region" data structures for each different region of the render output for which those primitives are determined to fall within, whereas primitive data for others of the primitives in the group may be stored in a data structure (or data structures) that is (are) associated with a plurality of regions of the render output.

Although in some embodiments a single "global" combined data structure is allocated for the entire render output, such that the "global" data structure may contain primitive data for any (and all) of the render output regions, it will be appreciated that rather than providing a single "global" data structure covering the entire render output in embodiments there may be a plurality of data structures, each associated with a different plurality of regions of the render output, e.g., and in an embodiment, that together cover the entire render output.

In that case, the associated primitive data for a primitive may either be stored in each of the respective "per region" data structures for the render output regions it is determined that the primitive is to be rendered for, or in a (larger) combined data structure (or data structures), covering the render output regions it is determined that the primitive is to be rendered for.

It has been found that this approach may provide various advantages, e.g. compared to a traditional tile-based rendering system, as will be explained further below.

For instance, an effect of storing at least some of the data on a "per region" basis, with the primitive data being organised and stored in separate data structures for the respective, different regions of the render output (and which data structures are associated only with a particular region, such that the primitive data is stored separately for different render output regions), is that it can thereby be ensured that any primitive data that is stored for a particular region (in its respective data structure) necessarily has the same locality (i.e. is associated with the same render output region) and also the same "life-cycle".

This means that the (and any) primitive data that is stored in this way can be used independently for different regions of the render output. This also means that primitive data stored for a particular region in its respective data structure can be discarded after it has been used without impacting on any later processing (e.g. rendering) of the same, or any of the other, render output regions.

This can allow for a more dynamic allocation of memory resource, such that this approach can be readily scaled based on the amount of available memory space, as will be explained further below.

For instance, the Applicants have recognised that while in some cases the available memory space may be sufficiently large to store all of the primitive data that will be generated for the render output (such that the entirety of the primitive data may be written in order into the various data structures, and then passed to the next stage of the graphics processor (e.g. for rasterisation/rendering, as required) only after all of the data has been processed), in other cases there may only be a certain, fixed amount of memory available for the data structures for the different render output regions (and in embodiments this is the case) which can therefore become full as new data is added and memory space used up.

An advantage of storing and organising at least some of the primitive data on a per region basis is that memory space can be and in an embodiment is allocated for different regions of the render output "on demand", i.e. when it is determined that a primitive is to be rendered for a region.

The data structures associated with the different render output regions can then be selectively 'flushed', as desired, e.g. when the memory space is becoming full, such that the primitive data stored in a data structure for a particular region can be used (e.g. for rendering the region, at least in part), and after the primitive data has been used the primitive data can then be released for re-use, and discarded, to free up memory space for new primitive data.

This means that a smaller amount of memory space can be set aside for storing the primitive data in comparison, e.g., to more traditional tile-based arrangements in which the primitive data for the entire render output is stored before any of this data can be used.

In other words, by storing at least some of the primitive data in respective data structures for the different render output regions, the technology described herein may help reduce the amount of "in flight" data that needs to be stored in the memory space at any given time.

Accordingly, it is a benefit of the technology described herein that the primitive data stored in any one or more of the respective data structure(s) for the render output regions can be used, and then discarded, e.g. to free up memory space as required for new data as subsequent primitives are processed, even during the processing of a given render output unit of processing (e.g. draw call).

In this way, the technology described herein may therefore allow for an improved (more efficient) usage of memory space and/or improvements in power or performance. In particular, since it is no longer necessary to wait for the processing for all of the geometry data for the entire render output unit of processing to complete before starting to use the geometry data to start rendering the output, the geometry data can be used, and the associated memory space reallocated, as required, in a more dynamic fashion.

For instance, in the technology described herein, the rendering may, in effect, be performed in a "partially deferred" manner, wherein stored primitive data for at least some of the regions can be processed and used to render (at least in part) those regions without having to wait on the processing of any other data (and independently of any other stored data and/or data that is yet to be processed).

As explained above, when primitive data is being stored separately in respective data structures for the different render output regions, in order to ensure that the primitive data stored in the respective data structure for a region has the same life-cycle, the primitive data for a primitive (or set of primitives) is duplicated and stored in respective, different data structures for each and every one of the regions of the render output for which it has been determined that the primitive (or set of primitives) should be rendered for.

It will be appreciated that this means data for the same primitive (or set of primitives) may therefore need to be stored in multiple places, i.e. a copy of the primitive data should be (and in embodiments is) stored in the respective data structures for each of the render output regions that the primitive (or set of primitives) needs to be rendered for. (By contrast, in a traditional tile-based approach, the primitive data for each primitive may only need to be stored once, as the spatial distribution (locality) of the primitive is specified by the primitive lists.)

For most cases this may be acceptable since the costs associated with duplicating the primitive data is relatively small (and outweighed by the benefits of having the data in each of the different data structures for the respective, different render output regions having the same lifecycle).

However, the Applicants have recognised that in some cases it may be more desirable to store the primitive data for some primitives (or sets of primitives) in a separate "combined" data structure that is allocated for a plurality of regions of the render output (and in an embodiment that is allocated for the entire render output, i.e. a "global" data structure). For example, this may help to avoid over-duplication of larger primitives, e.g. which may fall across multiple different render output regions.

Which manner primitive data for a primitive should be (and is) stored is determined in the technology described herein based on a property of the primitive (or set of primitives). This property may be determined in advance, e.g. specified by the API, and the primitive data marked accordingly so that the primitive data storing circuit is able to identify in which manner the primitive data should be stored (and to then store the primitive data accordingly in the appropriate data structure(s)). Alternatively, and in some embodiments, the primitive data is tested to determine in which manner the primitive data should be stored.

For example, in an embodiment, the property that is used to determine in which manner the associated primitive data should be stored is reflective of a (spatial) size (area) of the primitive (or set of primitives), and most in an embodiment of the render output coverage size (area) of the primitive (or set of primitives).

For instance, it will be appreciated that where a primitive extends, e.g., across (substantially) the entirety of the render output (which primitive may generally be classified as a "full screen" primitive), attempting to store the associated primitive data separately in each of the different "per region" data structures for the different render output regions in which the primitive falls may then require storing the same primitive data for a single primitive potentially thousands of times, e.g. depending on the number and size of the regions into which the render output has been divided.

In this case, duplicating the primitive data for all of the render output regions may then involve considerable memory and/or time resource.

Accordingly, the present Applicants have recognised that in such cases it may be more desirable to store the primitive data for a primitive (or set of primitives) determined to be rendered for the entire render output in a separate "combined" data structure that is in an embodiment allocated for the entire render output (i.e. a "global" data structure), e.g. in order to prevent over-duplication of the primitive data.

Thus, according to the technology described herein, a separate, in an embodiment "global", data structure is maintained (alongside the respective data structures for the different regions of the render output), which global data structure can be and in an embodiment is used to store such relatively larger (e.g. full screen) primitives. The global data structure is thus allocated for the entire render output, and may contain primitive data for primitives falling in any (or all) of the regions of the render output.

When a primitive (or set of primitives) is received to be processed, the primitive coverage may thus be initially checked to determine how many regions of the render output the primitive(s) falls within (at least partially covers) (and should thus be rendered for). Depending on the outcome of this testing, i.e. based on the size (coverage) of the primitive(s), it is in an embodiment then determined whether the associated primitive data should be stored in different, respective data structures for the different regions of the render output (i.e. on a per region basis) or more globally for the render output in the appropriate combined data structure.

In particular, where the primitive (or set of primitives) falls across greater than a certain threshold number of render output regions, the primitive data is not stored separately for each of the different render output regions but is instead added into the appropriate combined (e.g. global) data structure.

Thus, in embodiments, the method comprises: calculating the number of regions of the render output it is determined that the primitive (or set of primitives) should be rendered for;

determining whether the number of regions of the render output it is determined that the primitive (or set of primitives) should be rendered for is greater than a threshold number of regions of the render output; and in dependence on determining that the number of regions of the render output the primitive should be rendered for is greater than the threshold number of regions of the render output, storing primitive data for rendering the primitive (or set of primitives) in a combined data structure in memory that is associated with a plurality of regions of the entire render output, whereas when it is determined that the number of regions of the render output the primitive should be rendered for is fewer than or equal to the threshold number of regions of the render output, rather than storing the primitive data in the combined data structure that is allocated for the entire render output, storing primitive data for rendering the primitive (or set of primitives) in a different respective data structure in memory for each different region of the render output the primitive (or set of primitives) should be rendered for.

The threshold (render output) size (coverage), i.e. number of render output regions, based on which a primitive (or set of primitives) is stored in the combined (e.g. global) data structure rather being duplicated into respective data structures for each different render output region the primitive (or set of primitives) should be rendered for may be set appropriately to provide a desired balance between the amount of duplication required and the processing efficiency, e.g. depending on the size of the regions into which the render output has been divided.

For instance, it will be appreciated that storing the primitive data in a separate, e.g. global, data structure may introduce additional processing complexity since primitive data for a particular region may now be stored either in a respective data structure for that region or in the global data structure for the entire render output, and this must be accounted for when it is desired to use the primitive data, e.g. to render a selected region (or selected regions) of the render output.

The Applicants have recognised that there may therefore be a trade-off between avoiding excessive duplication of primitive data and introducing additional processing complexity and the threshold size, i.e. number of render output regions, based on which a primitive (or set of primitives) is stored in the global data structure rather being duplicated into respective data structures for each different render output region the primitive (or set of primitives) should be rendered for may be set accordingly.

For example, in embodiments the threshold may be a single region such that there is no duplication of primitive data at all. In other embodiments, the threshold may be set so that primitive data for primitives (or sets of primitives) extending over greater than a particular proportion, e.g. greater than about 50% of the render output is stored in a, e.g., global data structure.

For example, the threshold may be based on the capabilities of the graphics processor and graphics processing system in question, such as on the number of output regions for which data can be written concurrently by the graphics processor (e.g. the number of (relevant) write back units the graphics processor has), e.g. with a primitive (or set of primitives) being stored in the global data structure if its coverage exceeds the number of output regions for which data can be written concurrently (or some multiple of that number). Various other arrangements would be possible in this regard.

It will be appreciated that such larger (e.g. "full screen") primitives may be relatively rare, and so it is typically expected the primitive data for most of the primitives will be stored in the respective, different data structures for the different regions. Correspondingly, the size of the regions into which the render output is divided may be tailored such that this is the case, i.e. such that the majority of primitives fall within only one (or relatively few, less than the threshold number of) region(s) of the render output and the associated primitive data is therefore stored in different respective data structures for the different render output regions.

In the technology described herein at least some of the primitive data is stored in respective "per region" data structures. At any instant in time there may therefore (and typically will) be a plurality of data structures in memory that are associated with, and contain respective primitive data for, a corresponding plurality of different regions of the render output (as well as the combined (e.g. global) data structure(s) containing primitive data, e.g., for (larger) primitives that may intersect any (or all) regions of the render output).

For instance, whilst various embodiments have been described with reference to the processing of, and storing primitive data associated with, a single primitive (or a single set of primitives that are processed together, which may, e.g., comprise a strip/mesh of primitives that are processed together), it will be appreciated that these steps will typically be repeated for a plurality of primitives that are to be rendered when generating a render output. When a new primitive (or set of primitives) is received to be processed, this is in an embodiment then processed in the same manner described above and written into the appropriate data structure(s) in memory.

In particular, when it is determined that the primitive data should be stored in a "per region" fashion, the primitive data is then written into (each of) the respective data structure(s) for the region(s) of the render output covered by the primitive(s).

Storing the primitive data in this "per region" fashion means that once primitive data for a particular region has been written into an appropriate "per region" data structure for the region, that data can then be used in order to render the primitives for that region for which the primitive data is stored (without necessarily having to wait on the processing of any other primitives (or any other regions)). That is, an effect of storing at least some of the primitive data separately for each of the render output regions, is that the respective sets of one or more primitive(s) for each render output region (for which primitive data is stored) can then be read out from the associated data structure and processed further by the graphics processor independently of any of the other render output regions.

This means that at least some of the primitives that are to be rendered for the region may be (and in some embodiments are) rendered 'early' even though there are other yet to be processed primitives that may also need to be rendered for the region. (This approach is therefore in contrast to a traditional tile-based rendering system in which all of the geometry data for the entire render output must typically be processed up-front during an initial processing pass when generating the primitive lists (as it is only once all the geometry has been sorted into the regions that all the geometry that needs to be processed for a given tile will be known) and in which the rasterising and rendering of the primitives in the tiles to generate the render output is in effect "deferred" until the initial processing of the primitives to sort them into the primitive lists has been completed.)

However, in the technology described herein some of the primitive data for primitives that should be rendered for the region may instead be stored in a combined (e.g. global) data structure associated with a plurality of render output regions.

Accordingly, when it is desired to use the primitive data, e.g. to render a region of the render output (at least in part), primitive data may thus need to be read out both from the respective data structure for the region and from the combined (e.g. global) data structure.

Thus, in embodiments, when it is desired to use primitive data in order to render a region of the render output, the method comprises reading out (e.g. using a suitable read-out circuit) primitive data for that region for use by the graphics processor from the respective data structure for the region and/or from a or the combined data structure that applies to the render output region as well.

Reading the data out from the data structure(s) for the selected region(s) for use by the graphics processor in an embodiment comprises passing the primitive data to the graphics processor for rendering the primitives for which primitive data is stored for the selected region(s).

As explained above, at least for the primitive data that is organised and stored on a per region basis, it is guaranteed that the primitive data has the same life-cycle and can therefore be used, e.g. to render that region, as required, without impacting on the processing of any other primitives for that, or any other, region.

However, because the primitives for which primitive data is stored in the combined (e.g. global) data structure may potentially intersect any and all of the plurality of render output regions covered by the combined data structure, the life-cycle for the primitive data stored in the combined data structure is (potentially) the life-cycle of all of the regions of the render output covered by the combined data structure (such that where the combined data structure is allocated for the entire render output, the life-cycle is then the life-cycle of the render output (e.g. frame) itself).

The Applicants have recognised that primitive data stored in the combined data structure therefore should not (and in an embodiment is not) discarded until all of the render output regions that the combined data structure applies to have been processed.

Further, the Applicants have recognised that these different life-cycles thus need to be managed, e.g. in order to maintain a desired primitive draw order.

For instance, in an embodiment, the primitive data is written into the appropriate data structure(s) in the order that the primitives are received for processing such that as and when (new) primitive data is written into an appropriate data structure, the ordering of the primitives is maintained in the data structure (such that the primitive draw order, e.g. as specified by the API, is preserved).

The data structure for a particular region therefore in an embodiment comprises an in-order list of the primitive(s) to be rendered for the region.

Similarly, the combined (e.g. global) data structure comprises an in-order list of all of the primitive(s) for which data has been stored in that fashion.

It will be appreciated that for a particular region the rendering of primitives for which data is stored in the combined (e.g. global) data structure may need to be interleaved with the rendering of primitives for which data is stored in the respective individual data structure for the region.

Thus, before starting to use any of the primitive data stored in the respective data structure for a region, a check should be (and in an embodiment is) made of the combined (e.g. global) data structure to determine whether there are any primitives stored in the combined (e.g. global) data structure that also need to be rendered for the region, and to determine in which order the primitives should be rendered.

To facilitate this check, the primitive data stored in the various data structure(s) is in an embodiment associated with data indicative of the primitive draw order. In an embodiment this data is provided in the form of a primitive order index, e.g. time-stamp.

Thus, the primitive data is in an embodiment associated with data (e.g. a time stamp) indicative of the primitive draw order. In an embodiment this data (e.g. the time stamp) is stored in the respective data structure(s) along with the primitive data.

However, other arrangements would of course be possible.

In embodiments, when primitive data is being read out (either from the "per region" data structures, or the "combined" data structure) for use by the graphics processor, the method thus further comprises checking the stored data (e.g. time stamp) indicative of the primitive draw order, and rendering the primitives in the desired primitive draw order based on the stored data (e.g. time stamp) indicative of the primitive draw order.

The read-out circuit may thus check the (next) primitives, e.g. at the heads of the respective lists of primitives, in both data structures, and then determine which primitive to read out next (from which data structure) based on the data indicative of the primitive draw order. For example, where the data comprises a time-stamp, this may involve reading out next the primitive having the lowest valued time stamp.

The read-out circuit can then work through the lists of primitive stored in the different data structures, and read the associated primitive data out in the correct primitive draw order, e.g. as determined based on the stored data (e.g. time-stamp) indicative of the primitive draw order.

Alternatively, it would also be possible to read out the data for a particular region, e.g. to render that region, by reading out the associated primitive data for all of the primitives for which primitive data is stored in any (and all) of the data structure(s) that may contain primitive data for that region into a suitable primitive ordering circuit (e.g. a suitable re-ordering buffer) that processes all of the primitives from the different data structures into a combined in-order list of the primitives to be rendered for that region.

The render output that is generated according to the technology described herein may, for example, comprise (at least a part of) a frame for display. For instance, the render output may comprise a (full) frame, or some other desired rendering unit, e.g. a draw call, for the frame. The render output is then generated by rendering one or more primitive(s) for the render output. The graphics processor in an embodiment uses associated state and geometry data when rendering the primitives, e.g. in the usual fashion.

For instance, the primitives may initially be defined by and represented as a set of vertices. Each vertex for a primitive has associated with it a set of data (such as position, colour, texture and other attributes data) representing the vertex.

The attributes of the vertices originally defined for a given graphics processing output (e.g. draw call) are thus in an embodiment subjected to an initial so-called "vertex shading" operation that operates to transform the attributes for each originally defined vertex into a desired form for the subsequent graphics processing operations. The initial processing of the primitives to generate the associated geometry data may thus comprise, for example, transforming the originally defined vertex position attributes from the world or user space that they are initially defined for to the screen space that the output of the graphics processing system is to be displayed in.

The initial processing of the primitives thus in an embodiment involves a step of vertex shading to generate transformed geometry data. The geometry data that is stored in the respective data structure(s) for the render output regions may thus comprise such transformed geometry data. Thus, in embodiments, the geometry data is obtained from a vertex shading stage of the graphics processor (pipeline).

However, in general, any other geometry-related processing that may typically or desirably by performed in a graphics processing system may be performed at this stage in order to generate (e.g. transformed) geometry data and other such data defining the primitives in the display in a form that is appropriate for use when rasterising and rendering the primitives.

The state data for a primitive includes the parameters for the processing of the primitives, e.g. control data specifying which operations to perform when rasterising and/or rendering the primitives, and so on. Any suitable state (control) information that may typically or desirably be used when rasterising and rendering graphics primitives may be used in embodiments. Some or all of the state data may be "shared" between plural primitives (or set of primitives), e.g. where it is defined on a per draw call basis.

As explained above, according to the technology described herein the render output (e.g. frame, or frame portion) is divided into a plurality of regions. In an embodiment, the render output is divided into a plurality of uniformly sized, e.g. rectangular (e.g. square), regions. However, other arrangements would of course be possible.

The regions may generally have any size, as desired. For example, in some embodiments, each region may correspond to a 32×32 or 64×64 array of fragments (and so it will be appreciated that the regions may be larger than the typical rendering tile sizes for conventional tile-based graphics processing systems). However, this need not be the case.

When processing a primitive in the manner of the technology described herein it is determined for which regions the primitive needs to be rendered for. This may be done, for example, by determining the intersections of the primitive with the regions of the render output (in a similar manner as would be done in a more traditional tile-based rendering approach when binning the primitives into their respective regions for rendering).

The primitive coverage is then checked by calculating how many regions of the render output the primitive should be rendered for. In embodiments, as described above, the number of regions of the render output it is determined the primitive should be rendered for is then compared to a set threshold number of regions in order to determine whether the primitive should be stored in a combined data structure (e.g. globally for the entire render output), or whether the primitive should be stored in different, respective data structures for each different render output region it is determined the primitive should be rendered for.

When it is determined that the primitive data should be stored separately in different, respective data structures for each different render output region it is determined the primitive should be rendered for, a data structure is thus generated for each region that a primitive needs to be rendered for, and stored in memory space, and the primitive data added into the data structure for the respective region(s), as required. There is therefore a self-contained data structure for each region of the render output that has a clear life-cycle and ownership of the data.

The data structure for a region may store the primitive data in any suitable fashion. For instance, the data may be stored either directly or indirectly and may be stored in a compressed or uncompressed (raw) format, as desired.

Thus, any stored indication of state data (where present) may be the state data itself, or may comprise a reference, e.g. in the form of a pointer, to state data stored in a separate "state data" data structure. Various arrangements may be possible in this regard.

While it would be possible to store all the primitive data for a region in sequence in a block (of the data structure), with data for one primitive stored after the data for the preceding primitive, in embodiments, the geometry data is stored in a different region of the data structure to the state data (i.e. or the indicators thereof).

For example, in an embodiment, the geometry data may include a set of vertex indices identifying the vertices to be used for the primitive(s) in question, as well as the (transformed) vertex (attribute) data (e.g. positions) for the primitives. In that case, the vertex indices and the state data (indicators) (where present) are in an embodiment stored in a first region of the data structure (a first set of memory positions/addresses) and the vertex data stored in a second, separate region of the data structure (a second set of memory positions/addresses). For instance, the first region may contain a list of indices interspersed with state data (indicators) for the primitives (such that there will, e.g., be a state data indication for a draw call, followed by indices for plural primitives for that draw call, followed by a new state data indication (e.g. for a new draw call), followed by another sequence of indices for primitives, and so on), with the second region containing the associated vertex data for the primitives. Where the geometry data includes set(s) of vertex indices identifying the vertices to be used for primitives for the render output region in question, the vertices to be indicated in the data structure for the render output region in question are in an embodiment respectively indexed within a set of vertices for the region of the render output in question (as opposed to being indexed with respect to a set of vertices for the render output as a whole) to ensure the independence of the per region data structures.

The indices/state data may, for example, be written from the top down such that the list of indices/state data 'grows' down from the first available memory position. The vertex data may on the other hand 'grow' upwardly from the last available memory position.

In an embodiment the time-stamps are also stored in the first region along with the indices and state data (indicators) (where present).

However, other arrangements would of course be possible.

In an embodiment, the memory space that is allocated to (and is available to be allocated to) a region comprises memory space from an appropriate pool of free memory space (a "heap") for use by the graphics processor.

The pool may thus comprise a number of "blocks" of memory space each of which is available to be allocated for a region of the render output. A data structure for a particular region may thus comprise a set of one or more such block(s) of memory space. In some embodiments these are fixed-size blocks of memory space. However, this need not be the case, and it is also contemplated e.g. that the size of a memory block may be variable.

Once a block of memory space has been allocated for a particular region, any primitive data for the region can then be added into the block (at least until the block is full). In an embodiment this is done in the manner described above with the indices/state data written from one end of the block (e.g. downwardly from the top of the block) and the vertex data written from the other end of the block (e.g. upwardly from the end of the block).

When a block is full, another block of memory space from the pool of free memory space can be allocated for the region, and a suitable pointer generated pointing from the end of the first block to the new block, and so on, to store the primitive data for the region. The data structure for a particular region may thus comprise a linked set of memory blocks.

In this case, each memory block making the data structure for a render output region will, in effect, and in an embodiment, store its own set of primitives for the render output region, and in a particular the primitive data, comprising geometry data and, in an embodiment, state data, for a given subset of primitives within the overall set of primitives that is stored in the data structure for the render output region. In an embodiment each block of memory space itself comprises a "self-contained" set of data that can be processed independently of the other memory blocks of the data structure for the render output region (and that accordingly has its own independent life-cycle).

Thus, for example, where the geometry data includes set(s) of vertex indices identifying the vertices to be used for primitives for the render output region in question, then in an embodiment, the vertices to be indicated in the data structure for the render output region in question are respectively indexed within a set of vertices for not only the region of the render output in question but also for each block of memory space. Similarly, the full state data for the relevant primitives is in an embodiment stored within each block of memory space. However this is not necessary so long as the data structure for a particular region as a whole has its own self-contained life-cycle.

In an embodiment, the allocation of memory space within the memory space pool to primitive data (for render output regions) is performed by first allocating a block of memory space for a region, and then allocating space within that block to individual primitives that are determined to fall within that region (and that should therefore be rendered for the region), until the block is full (at which point, if there is still space in the memory space pool, a further block is allocated and then progressively filled with primitive data, and so on, until there is no more space in the memory space pool).

Thus, in embodiments, the memory space pool comprises a plurality of memory blocks, and generating a data structure for a region comprises: allocating a first memory block for the region and adding primitive data for the region into the first memory block until the first memory block is full; and when the first memory block is full, allocating a second memory block for the region and linking the first and second memory blocks such that the data structure comprises a set of linked memory blocks. This is in an embodiment then repeated if/when the second memory block becomes full, with a third memory block then being allocated and linked to the second memory block, and so on.

Correspondingly, the primitive data storing circuit is configured to generate a data structure for a region by: allocating a first memory block for the region and adding primitive data for the region into the first memory block until the first memory block is full; and when the first memory block is full, allocating a second memory block for the region and linking the first and second memory blocks such that the data structure includes a set of linked memory blocks.

Each block from the memory pool is in an embodiment the same size, and is in an embodiment configured to always be an integer number of cache lines (e.g. an integer number of 64-byte cache lines). This means that the start of each new block will be cache-line aligned. This arrangement may facilitate more efficient memory accesses, for example by facilitating using complete cache lines for the primitive data that is stored for each region.

The memory space may thus be (dynamically) partitioned into a list of 'free' memory blocks that have not (yet) been allocated as well as a number of lists of 'active' memory blocks that have been allocated for the different regions. As blocks are allocated, they are then removed from the free list and added to the active list for the associated region. Correspondingly, after the data in an active block has been used, it can then be discarded, and the block made available for reallocation, and moved back into the free list.

The memory space that can be allocated for the data structures for the respective regions of the render output may comprise a portion of main (system) memory, e.g. DRAM. In that case, the memory space may grow over time, as and when additional storage is required. In that case, the available memory space may be sufficiently large to store all of the primitive data that will be generated for the render output, the entirety of the primitive data may be written in order into such data structures, and then passed to the next stage of the graphics processor (e.g. for rasterisation/rendering, as required) only after all of the data has been processed. That is, provided that the available memory space is large enough, the technology described herein may be used to perform a fully "deferred" rendering process. Thus, in some embodiments, the primitive data may be continuously written into such data structures in memory until all of the primitives have been processed.

However, there may be only a certain, fixed amount of available memory (and in some embodiments this is the case) which can therefore become full as new data is added and memory space used up. That is, in some embodiments, the amount of memory space that is available to be allocated for primitive data is smaller than the amount of memory that would (be expected to) be required to store all of the primitive data that would be generated for the entire render output unit of processing.

For instance, this may be the case where the memory comprises a dedicated, fixed-footprint portion of SRAM, or where it is desired to store the primitive data more locally to the graphics processor in a suitable local cache system.

As explained above, storing the primitive data on a "per region" basis means that memory space can be and in an embodiment is allocated for regions "on demand", which in turn allows a smaller amount of memory space to be set aside for storing the primitive data, e.g., to more traditional tile-based arrangements in which the primitive data for the entire render output must be stored before any of this data can be used.

For instance, in modern tile-based graphics processing systems, the primitive (geometry) data is increasingly too large to be effectively cached locally to the graphics processor. By contrast, in the technology described herein, memory space can be dynamically allocated, and then re-allocated as data structures are used up, and their associated memory space freed for new data. This makes it possible to use a relatively smaller amount of memory space, which may enable a more effective local caching of the primitive data, whilst maintaining throughput of primitive data.

The technology described herein can thus advantageously be implemented using a range of different (sized) memory systems and may allow for various optimisations in terms of power and performance in each case. A benefit of the technology described herein is therefore that it provides a highly scalable approach that can be used in conjunction with a range of memory types (e.g. DRAM, SRAM, cache, etc.).

Thus, when new primitive data for a primitive (or set of primitives) associated with a particular region is to be written to a respective data structure associated with that region memory, it is in an embodiment first determined whether memory space (a data structure) has already been allocated for the region. If memory space has already been allocated for the region, i.e. such that there already exists in memory a data structure for that region, the primitive data can then be added into the appropriate data structure in the allocated memory space for the region. In an embodiment the data structure comprises a number of memory blocks. When the current memory block is full, a new, free memory block can then be allocated and linked to the data structure.

On the other hand, if no memory space has yet been allocated for that region (and no data structure yet exists), memory space can be allocated for the region, and a new data structure for the region generated into which the geometry (and state (indicator)) data for the primitive can then be added. In an embodiment this is done by allocating a free block of memory space for the region in question.

Thus, in embodiments, the step of storing the primitive data in a respective data structure for a region comprises: determining (e.g. by the primitive data storing circuit of the graphics processor) whether a data structure for the region already exists in the memory, and when a data structure for the region already exists in the memory adding the primitive data to the existing data structure, whereas if no data structure for the region exists, the method comprises generating a new data structure for the region.

Correspondingly, the primitive data storing circuit may be configured to, when storing the primitive data in a respective data structure for a region: determine whether a data structure for the region already exists in the memory, and when a data structure for the region already exists in the memory add the primitive data to the existing data structure, whereas if no data structure for the region exists, the primitive data storing circuit is configured to generate a new data structure for the region.

It will be appreciated that in any of these cases, new memory blocks will periodically need to be allocated for storing primitive data (whether to expand the capacity for an existing region data structure, or to start a new region data structure). As such, the pool of available memory will progressively be used up (e.g. as memory blocks are allocated and moved from the 'free' list into the 'active' list as data structures are generated and stored.

This being the case, the Applicants have recognised that when it is determined that the available memory pool is becoming full (or nearly full), it may be desirable to 'flush' out at least some of the (existing) data structures in memory. For instance, when there is new primitive data (either for a new region, or a region for which a data structure already exists in memory) to be written into memory, but the memory space is full (or nearly full), it may be desirable to start to use (and flush out) some of the data that is currently stored in memory, e.g. to allow for continued throughput of primitive data.

That is, when it is determined that there is no available memory, or less than a threshold amount of memory is available, some of the active blocks can be (and in an embodiment are) flushed from memory for use by the graphics processor, and then discarded to free up memory space for new data. For example, this may be done when it is determined that there is less than a (e.g. predetermined) threshold of available memory space, e.g. less than a threshold number of free memory blocks.

The technology described herein facilitates this operation because where the primitive data is stored on a "per region" basis, that data can be selectively (and independently) flushed for one or more regions, and it is ensured that this data can be used, and then discarded to free up memory space, without impacting on any subsequent operations.

Thus, in an embodiment, when new primitive data is to be written to memory, but the memory is full (or more in an embodiment nearly full), one or more of the region(s) are selected to be rendered and the data in the associated data structure(s) in memory for the selected region(s) is then processed (used), such that the associated data structure(s) in memory for the selected region(s) can then be flushed from memory (the stored data discarded).

The method thus in an embodiment further comprises, tracking the available memory space, and determining when there is less than a threshold of available memory space. When it is determined that there is less than a threshold of available memory space the method may comprise: selecting one or more of the region(s) to be rendered, reading out the data stored in the data structure(s) for the selected region(s), and then discarding the data structure(s) for the selected region(s) to allow new data to be written into the memory space.

In particular, in embodiments, when attempting to allocate a new memory block (either to an existing data structure for a region, or to create a new data structure), it is in an embodiment determined whether there is less than a threshold of available memory space, and when there is less than the threshold of available memory space: selecting one or more region(s) for which a data structure already exists in memory to be flushed from memory; reading the data out from the data structure(s) for the selected region(s) for use by the graphics processor; and then discarding the data structure(s) for the selected region(s) from memory to free up memory space.

Correspondingly, when it is determined that new primitive data for a primitive (or set of primitives) should be stored in one or more data structure(s) in memory, the primitive data storing circuit is configured to: determine whether there is less than a threshold of available space in the memory, and when there is less than the threshold of available space in the memory, a read-out circuit is configured to: select one or more region(s) for which a data structure already exists in memory to be flushed from memory; read the data out from the data structure(s) for the selected region(s) for use by the graphics processor; and then discard the data structure(s) for the selected region(s) from memory to free up memory space.

The regions (blocks) that are flushed (used) may be selected based on any suitable criteria. For instance, in one embodiment, it is determined for which region(s) the data structure is largest (e.g. containing the most number of memory blocks and/or the greatest amount of primitive data), and that data structure is then selected to be flushed (used). Thus, in embodiments, one or more region(s) are selected to be flushed based on for which of the region(s) the greatest amount of primitive data is (currently) stored in the memory. The read-out circuit may thus be configured to select region(s) to be flushed based on for which of the region(s) the greatest amount of primitive data is (currently) stored in the memory. The determination may however be made in a more or less sophisticated manner, as desired.

For instance, the determination may be made based on which region(s) have already been at least partly rendered. For example, the system may track how many primitives have been processed for the different regions and take account of this when selecting which region(s) to be flushed.

However, other arrangements would of course be possible. For example, the system may select region(s) to be flushed based on any suitable, e.g. lifetime, policy.

It may also be desirable to be able to explicitly flush (all of) the data structures for the different render output regions from memory, e.g. for system maintenance purposes and/or at the end of a (e.g.) frame, and in embodiments this may be done.

The data from the data structure(s) for the selected region(s) is in an embodiment read out from memory and then used for rasterising/rendering the primitive(s) for the region. For example, the data may be read out and then passed to a rasterisation circuit of the graphics processor, wherein the primitives are in an embodiment rasterised (optionally after any primitive set-up is performed) and then, if needed, rendered for the output.

A read-out circuit of the graphics processor may thus be configured to read the data out from the data structure(s) for the selected region(s) for use by the graphics processor by passing the geometry data and state data to the graphics processor for rendering the primitives for which such data is stored in the data structure(s) for the selected region(s).

Thus, the graphics processor can start to render the selected render output region(s) using the data stored in its associated data structure.

It will be appreciated that the region(s) may only be partially rendered at this point since only the primitives for which data is currently stored (which may be less than all of the primitives that ultimately need to be rendered for the region) is flushed at this point. However, there may be further primitives that are to be rendered for that region, which have not yet been processed. In that case, when such primitives are processed, a new data structure for the region can be generated in the manner described herein, and then used/flushed, and so on, until all of the primitives have been processed.

Thus, in embodiments, the method may comprise selecting a first region to be flushed, rendering one or more primitive(s) for the first region using the geometry data and state data stored for the one or more primitive(s) in the respective data structure for the first region, and (after the data in the data structure has been used) discarding the data structure for the first region. When it is determined that a subsequent primitive should be rendered for the first region, the method then comprises generating a new data structure in memory for the first region, and so on.

Correspondingly, the read-out circuit may be configured to select a first region to be flushed, and to then read out the primitive data stored in the respective data structure for the first region so that the primitive data can then be used to render one or more primitive(s) for the first region. The data structure can then be discarded after the data has been used. When it is determined that a subsequent primitive should be rendered for the first region the primitive data storing circuit is then configured to generate a new data structure in memory for the first region.

Of course, in general, this may be performed for any, or a plurality of regions. Thus, at any instant in time, there may be a plurality of data structures for a corresponding plurality of regions, and these data structures may be flushed, and new data structures generated, as required.

However, other arrangements would of course be possible. For example, the flushed data need not be used directly (immediately) by the graphics processor for rasterising, etc., the primitive(s), and at least some of the data may be transferred to and temporarily held in other storage such as an intermediate buffer, or a different portion of (e.g. DRAM) memory, or similar. In that case, the associated memory blocks can be freed up by moving the data to such other storage. The flushed data can then be rendered from the other storage, e.g. at the appropriate time.

As discussed above, an advantage of the technology described herein is therefore that the primitive data is stored separately for each region such that the data can be used independently. Accordingly, when it is determined that there is no available memory, or less than a threshold amount of memory is available, one or more of the data structures (for a corresponding one or more region(s) of the render output) are in an embodiment read out from memory at this point and passed to the next stage of the graphics processor, e.g. for rasterisation and rendering. This helps ensure continued throughput of primitive data and a more efficient use of the available memory space.

Further, because at least some of the primitive data is stored on a per region basis, it can be ensured that once any data stored in this way has been used, it will not be needed again (e.g. for another region, since it would already be stored separately in the appropriate data structure for the other region), and so can be discarded at this point.

The memory space can thus be dynamically reallocated over time as and when new primitive data is generated. For instance, where there is a fixed region of memory that is partitioned into a number of fixed size blocks, the blocks can be allocated, used and re-allocated accordingly as the free list is consumed to maintain throughput whilst still allowing all of the data to be used and without impacting on any other operations.

This arrangement provides a more efficient usage of memory that can be readily implemented (and scaled) based on the amount of available memory space. Thus, it will be appreciated that by storing at least some of the primitive data in a "per region" fashion the technology described herein provides various benefits compared to more traditional tile-based approaches.

As explained above, rather than processing each and every primitive that is received to be processed in the same manner described above, i.e. by determining which render output regions the primitive should be rendered for, and then storing the primitive data in respective data structures for each region that it has been determined the primitive should be rendered for, for some (e.g. relatively larger) primitives, the primitive data is instead stored in a combined data structure that is allocated for a larger area of the render output, and in an embodiment for the entire render output level (i.e. the primitive data is stored on a more "global" basis).

Thus, according to the technology described herein, when a new primitive is received to be processed, it is first checked in which manner the primitive data should be stored, and the primitive data is then written into the appropriate data structure(s) accordingly.

As explained above, the life-cycle of the combined data structure is typically longer than the life-cycles of the respective "per region" data structures. The Applicants have thus recognised that the combined data structure should not be flushed until all of the render output regions covered by the combined data structure have been rendered.

Thus, when the "per region" data structures are flushed, and released (discarded) to free up memory space, the combined data structure typically should not be (and therefore is not) flushed at this stage (as it may still contain primitive data for other regions of the render output that are not being flushed). Thus, when one or more region(s) are selected to be rendered, and the associated "per region" data structures flushed, the combined data structure is in an embodiment not flushed.

For example, where the combined data structure is a global data structure allocated for the entire render output, the life-cycle of this global data structure is then the life-cycle of the render output (e.g. frame), and the combined data structure should not be (and in an embodiment is not) flushed until the render output has been generated (e.g. at the end of the frame, at which point all of the data structures (including the combined data structures) may be explicitly flushed).

Thus, in embodiments, when it is determined that new primitive data for a primitive (or set of primitives) should be stored in one or more data structure(s) in memory, the primitive data storing circuit is configured to: determine whether there is less than a threshold of available space in the memory, and when there is less than the threshold of available space in the memory, a read-out circuit is configured to: select one or more region(s) for which a data structure already exists in memory to be flushed from memory; read the data out from the data structure(s) for the selected region(s) for use by the graphics processor; and then discard the data structure(s) for the selected region(s) from memory to free up memory space, but not discard the combined data structure(s) (at this point).

In an embodiment the combined data structure is flushed (and in some embodiments only flushed) once all of the render output regions covered by the combined data structure have been rendered. This also ensures that all of the data that may be stored in the combined data structure is used.

For instance, as described above, the rendering of the different regions of the render output is in an embodiment triggered by there being no available space for storing new primitive data in the "per region" data structures. However, this means that there may be some primitive data stored in the combined data structure that would not be triggered to be flushed. In an embodiment, the combined data structure is explicitly flushed at the end of the render output.

Thus, in embodiments, all of the data structures, including the combined data structure(s), are explicitly flushed at the end of the render output (and discarded once the associated primitive data has been used).

The combined data structure(s) may reside in the same portion of the memory system as the respective data structures associated with the different regions of the render output. Thus, in some embodiments, the combined data structure(s) also comprises a set of memory blocks from a plurality of available memory blocks (and the memory blocks are able to be allocated either to a respective data structure for a region of the render output, or to the combined data structure(s)).

However, it is also contemplated in some embodiments that the combined data structure may reside in a different portion of the memory system to the respective data structures associated with associated with the different regions of the render output. For instance, in some embodiments, the combined data structure may be stored in a lower level of the memory system. For example, the respective data structures associated with associated with the different regions of the render output may reside in a portion of SRAM memory, whereas the combined data structure resides in a portion of main (DRAM) memory.

This may work well since the portion of memory for the combined data structure is not dynamically re-allocated in the same manner as the respective data structures (due to its longer life-cycle).

In a similar fashion as described above for the "per region" data structures, the combined data structure(s) may generally have either a fixed or variable size. Where there is only a certain, fixed amount of available memory allocated for the or a combined data structure (which is the case in some embodiments) the combined data structure may therefore become full as new data is added and memory space used up. For instance, this may especially be the case where the render output contains a large number of, e.g., relatively larger primitives, which are accordingly stored in the combined data structure.

In that case, a flushing mechanism is in an embodiment provided to avoid overflowing of the combined data structure(s), and to allow continued throughput of primitive data and continued generation of the render output, e.g. in a similar manner as described above for the "per region" data structures.

However, because the combined data structure covers a plurality of, e.g. and in an embodiment all of, the regions of the render output, the Applicants have recognised that the or a combined data structure should not be, and in an embodiment is not, "flushed" until all of the respective data structures for the different regions that are covered by the combined data structure have been processed.

Accordingly, in an embodiment, when the or a combined data structure becomes full, all of the "per region" data structures for the plurality different render output regions associated with the combined data structure that are currently stored in memory are flushed as well as the combined data structure to free up memory space.

Various other arrangements would be possible in this regard.

The structure of the combined data structure may generally be similar to the respective data structures. For instance, in the same manner described above, the primitive indices and the state data (indicators) may be stored in a first region of the combined data structure (a first set of memory positions/addresses) and the vertex data stored in a second, separate region of the data structure (a second set of memory positions/addresses).

However, this need not be the case, and the combined data structure may be arranged in any suitable and desired fashion.

In some embodiments, the combined data structure implements a hierarchical binning process. For instance, any primitive data that is written into the combined data structure may be stored and organised in a hierarchical fashion, using various different bin sizes (levels in the hierarchy), e.g. going from the size of the entire render output down to the size of the regions into which the render output has been divided for rendering (the lowest level). The primitive data may thus be stored in the combined data structure in such hierarchical fashion depending on the size of the associated primitive(s).

The area of the render output that is covered by the combined data structure (which may, e.g. be the entire render output) may thus be divided into sub-areas of varying areas going from the full area of the render output that is covered by the combined data structure down to the area of the render output regions into which the render output has been divided for rendering. The primitive data can then be binned accordingly at the appropriate level of the hierarchy, e.g. depending on the primitive coverage. For example, primitives that cover the entire area of the render output that is covered by the combined data structure are stored at the top level of the hierarchy, and so on.

This hierarchical organisation may thus allow the (approximate) primitive coverage, in terms of the render output regions, to be immediately identified. For instance, it can be immediately identified that any primitives stored at the top level should be rendered for all of the render output regions covered by the combined data structure, and so on.

Storing the primitive data in a hierarchical fashion thus allows a determination to be made as to whether or not a primitive should be rendered for a particular region (thereby avoiding unnecessary rendering of primitives that do not actually appear in a particular region). This hierarchical organisation of the data in the combined data structure can generally work well since each render output region corresponds to a certain area of the render output.

Thus, when it is desired to render a particular region of the render output, the combined data structure may first be checked, and the primitives that need to be rendered for that region are then determined by reference to the hierarchical structure.

In this way, which primitives need to be rendered for which regions of the render output may be effectively tracked. Various other arrangements for tracking the locality of the primitives stored in the combined data structure may also be used.

However, it would also be possible to not attempt to track the locality of the primitives stored in the combined data structure, and in some embodiments this is done. Thus, in some embodiments, all of the primitives in the combined data structure may be read out, as appropriate, for each and every render output region. The rasterisation and rendering processes can then determine whether or not the primitive actually needs to be rendered for a particular region. This approach may be more efficient, e.g. especially where only relatively few primitives are exceptionally stored in the combined data structure, and the majority of the primitive data is stored on a per region basis.

The technology described herein can be used for all forms of output that a graphics processor may be used to generate, such as frames for display, render-to-texture outputs, etc.

The graphics processor in an embodiment executes a graphics processing pipeline that can contain any suitable and desired processing stages, etc. that a graphics processing pipeline may normally include.

In some embodiments, the graphics processor comprises, and/or is in communication with, one or more memories and/or memory devices that store the data described herein, such as the primitive (geometry and state) data, etc., and/or store software for performing the processes described herein. The graphics processing pipeline may also be in communication with a host microprocessor, and/or with a display for displaying images based on the data generated by the graphics processor.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code means adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

Various embodiments will now be described.

The technology described herein generally relates to methods for processing graphics primitives wherein the render output is divided into a plurality of smaller regions (areas) for rendering. In the present embodiments the primitive data is stored and organised on a per region basis. When a primitive is received for processing, it is thus determined for which region(s) of the plurality of regions into which the render output has been divided that the primitive should be rendered for, and the primitive data for the primitive (e.g. the geometry data representing the primitive and any state data indicative of the operations to be performed when rendering the primitive) is then stored in respective, different data structures for each different region of the render output, as will be explained further below.

However, by way of comparison, a more traditional tile-based rendering system will first be described with reference to FIGS. 1, 2 and 3. In a tile-based rendering system the render output is divided into a plurality of tiles for rendering. The tiles are then rendered separately to generate the render output. To do this, it is first necessary to sort the primitives according to which tiles they should be rendered for.

The primitive vertices are thus obtained and the usual geometry processing (e.g. vertex shading) is performed for all of the primitives in order to generate the post-transformed geometry data (e.g. transformed vertices).

In order to be able to know which primitives should be rendered for which tiles it is required to perform this processing up front for all of the primitives that are to be processed. The result of this is, as shown in FIG. 1, that all of the geometry data generated from the geometry processing 10 is then stored in memory 12 in a first data structure 16. The primitive lists are stored in a separate data structure 18 and any pixel state data is stored in a further data structure 14.

Figure 2:
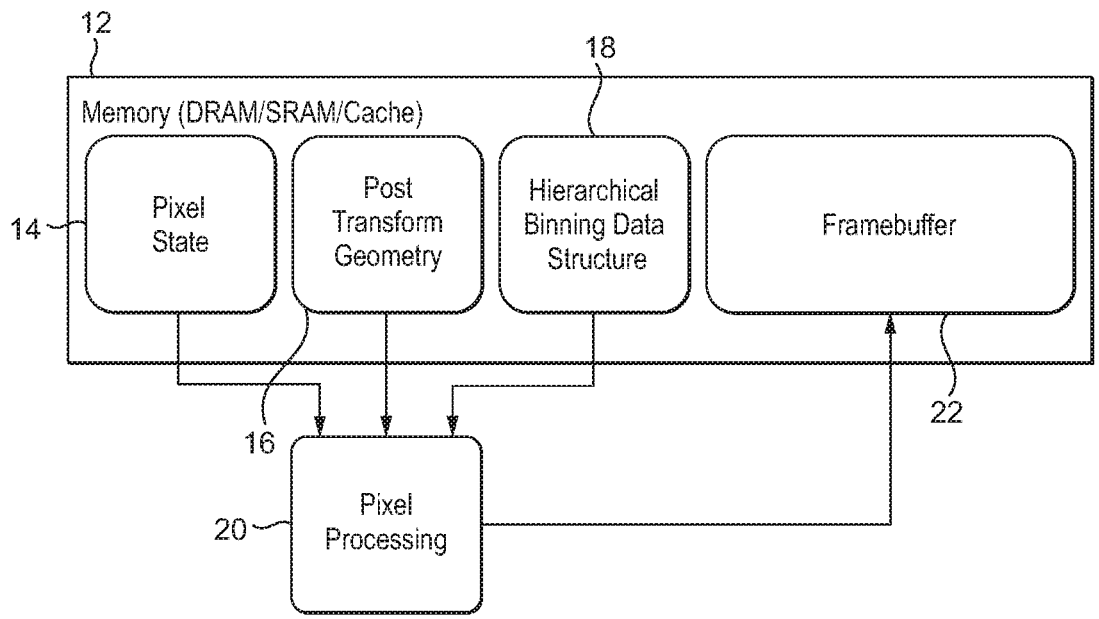
Figure 3:
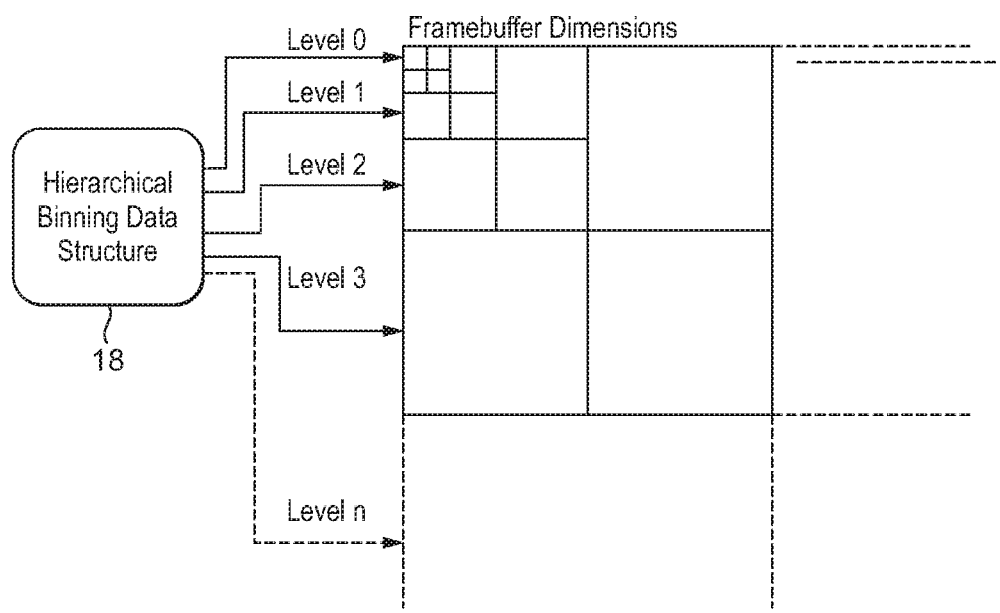

As shown in FIG. 2, once all of the geometry processing for the render output has completed, this data is then read out from memory and subject to further graphics processing 20 to generate the render output which may, for example, be written into a framebuffer 22. Other arrangements would of course be possible.

In particular, the graphics processing 20 is performed by using the primitive lists 18 to determine which primitives should be rendered and then rendering these primitives appropriately using the stored geometry data 16 and associated pixel state information 14. The rendering process is shown schematically in FIG. 3 (which illustrates a hierarchical binning process wherein primitive data is binned over a plurality of different levels (tile sizes), although this is not necessary and the binning may generally be performed in a more or less sophisticated manner as desired).

In the traditional tile-based graphics processing operation described above all of the geometry processing for the render output is performed in one go during an initial processing pass. This data is then used in a second processing pass during which the render output is generated by rasterising/rendering the primitive using their associated geometry.

For modern graphics processors, the primitive data for the render output can be relatively large such that it cannot be effectively cached in local storage associated with the graphics processor. The primitive data is therefore typically written back to main (system) memory, or at least to a relatively larger cache in the memory hierarchy.

The present embodiments provide a more efficient usage of memory. In particular, in the present embodiments, rather than storing all of the state and geometry data for the render output together, along with a separate binning data structure (e.g. the primitive lists) describing the spatial distribution of the primitives, the render output (e.g. framebuffer) is divided into a plurality of smaller area regions, and the state data and geometry data (at least for some of the primitives) is stored in separate data structures for each of the render output regions.

Figure 4:
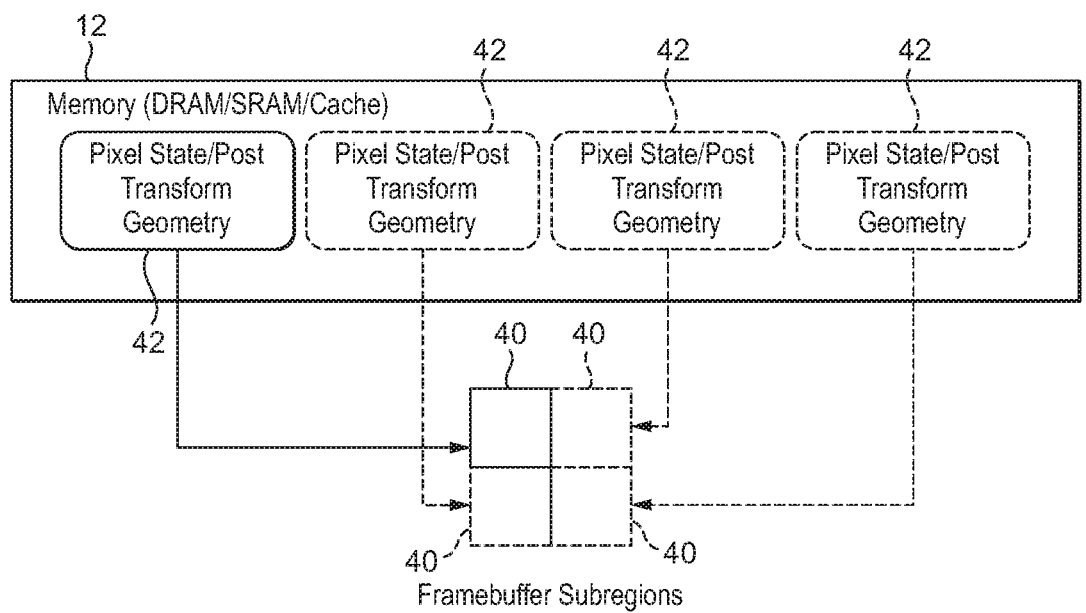
FIG. 4 shows an example of how primitive data may be organised according to an embodiment.
Figure 5:
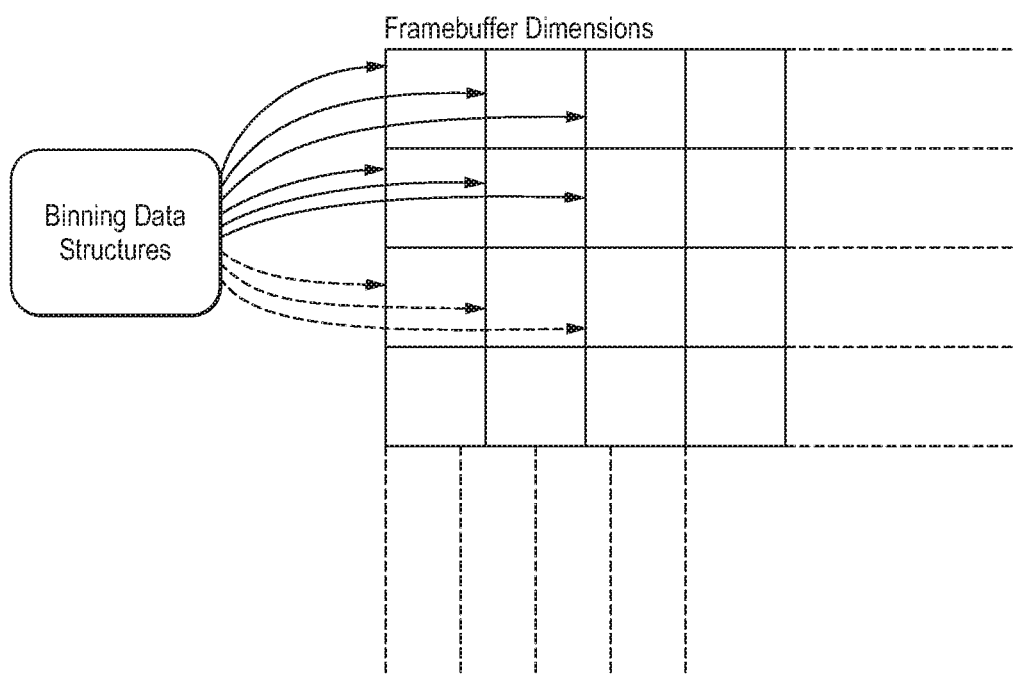
FIG. 5 shows schematically how the primitive data may be used when generating a render output according to an embodiment.

Thus, as shown in FIG. 4, each region of the render output 40 (e.g. frame buffer region) is associated with a respective data structure 42 in memory that contains pixel state and geometry data for that region (only). This means that each region can be processed independently, as illustrated in FIG. 5, using the data stored in its respective data structure 42.

However, in the present embodiment, rather than storing all of the primitive data in such respective data structures 42, some of the primitive data is instead stored "globally" in a combined data structure that is allocated for the entire render output, as will be explained further below.

In particular, this is done for relatively larger (e.g. "full screen") primitives, e.g. to avoid over-duplication of the associated primitive data.

In the present embodiment the data is stored hierarchically in the combined data structure, although this need not be the case.

The overall operation of the graphics processing system according to the present embodiments will now be described with reference to FIG. 6.

Figure 6:
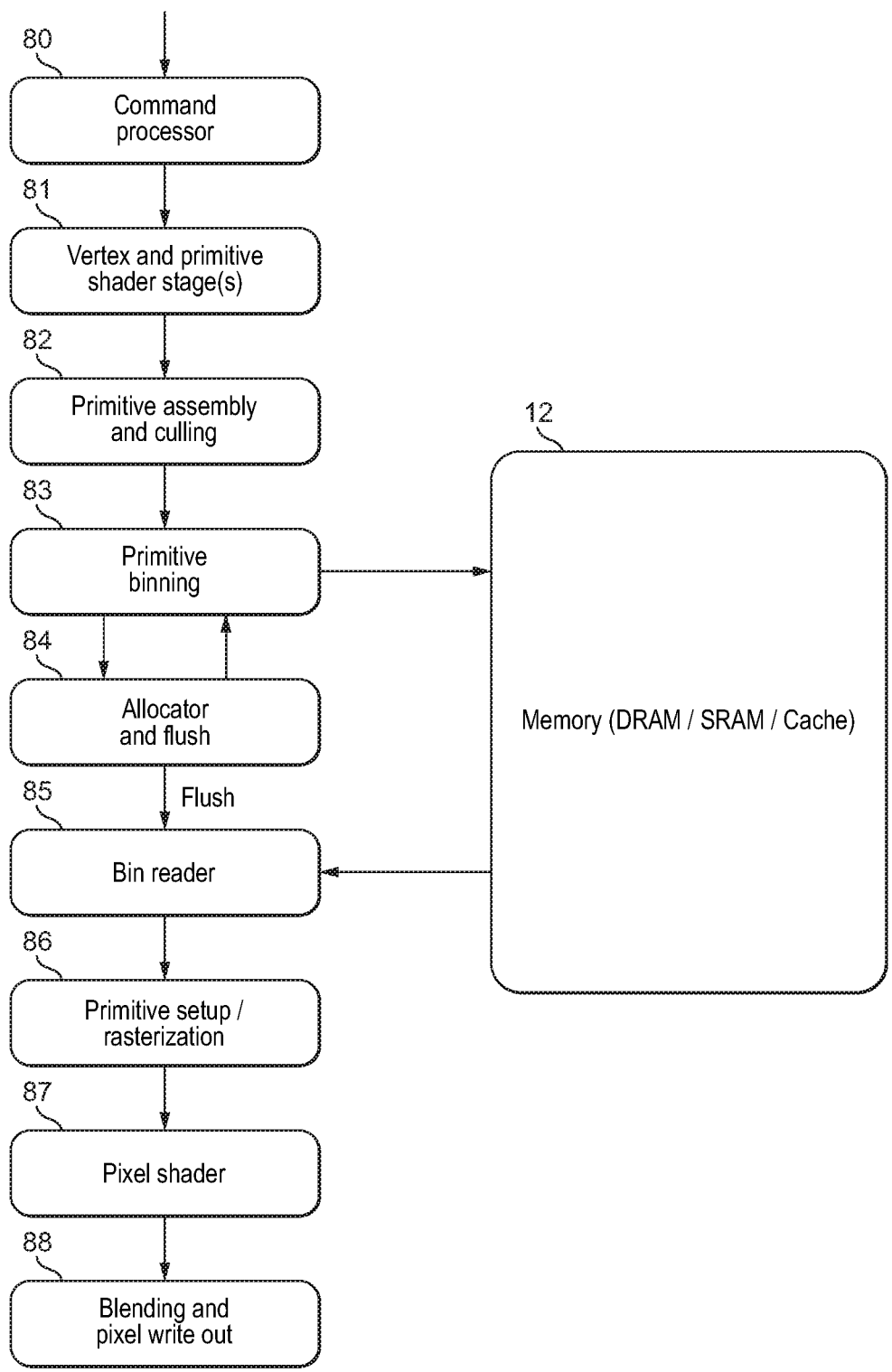
FIG. 6 shows schematically a graphics processing pipeline that a graphics processor may execute according to an embodiment.

FIG. 6 shows an example of a graphics processing pipeline that may be executed on a graphics processor that is communicating with a memory system. The memory system may be a cache, or may comprise a dedicated portion of SRAM or DRAM.

The first stage of the graphics processing pipeline comprises a command processor 80 that receives and processes commands, e.g. from an application requesting the graphics processing operation. The commands may specify, for example, a render output that is to be generated by reference to the primitives that need to be rendered.

Thus, in the next stage, the primitive's vertices are obtained and then processed accordingly, e.g. by shading the vertices and/or primitives in the usual fashion.

After the vertex and primitive shader stage(s) 81, an initial step of primitive assembly and culling 82 may then be performed based on the primitive data.

The primitives are then sorted based on which regions they are to be rendered for and the primitive data is then written into the respective memory data structures appropriately.

Figure 7:
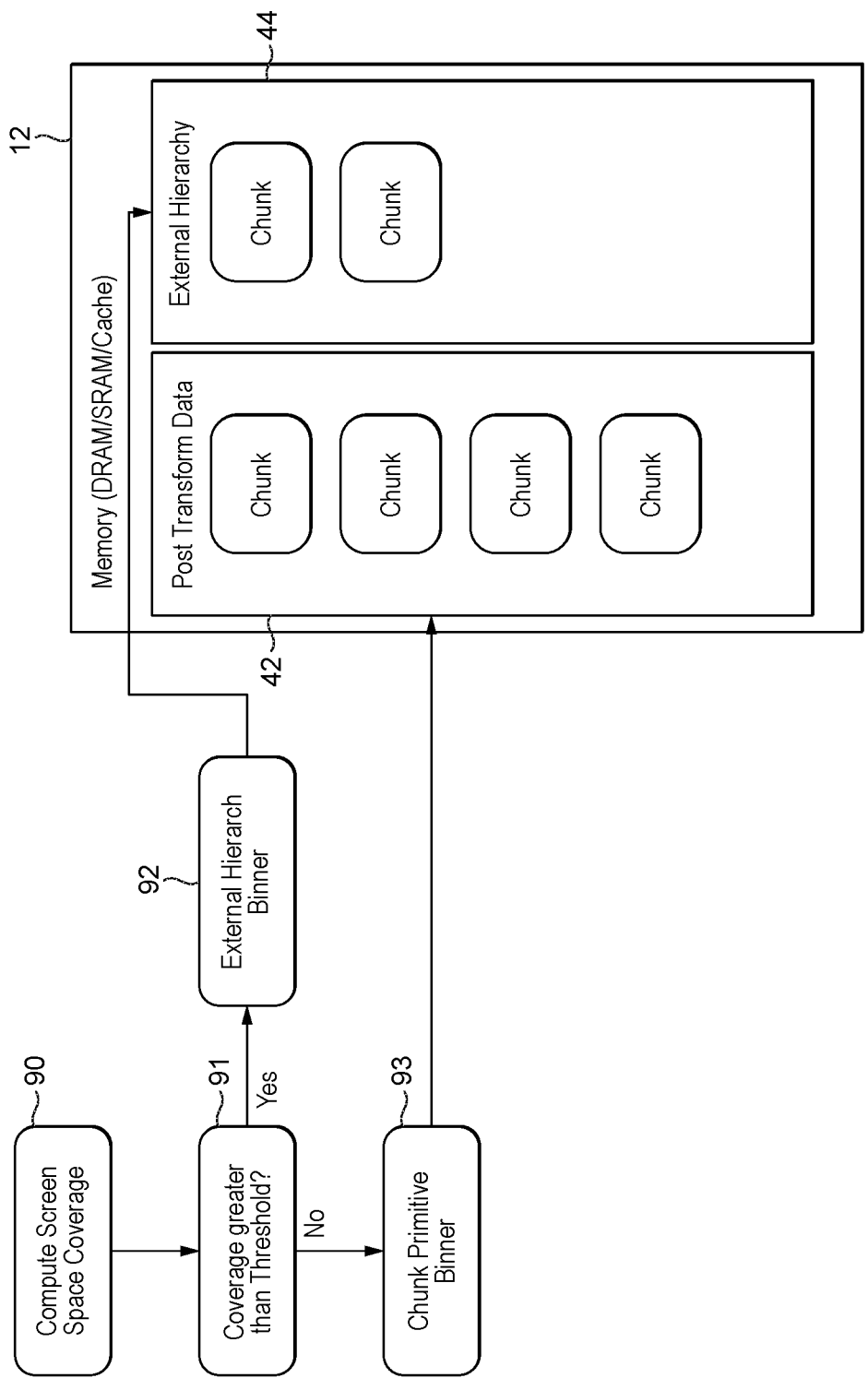
FIG. 7 shows in more detail how primitive data is stored according to an embodiment.

The primitive binning 83 either into the respective "per region" data structures 42, or into the "global" data structure, is illustrated in more detail in FIG. 7. As shown, for each primitive that is being processed (passing through the graphics processing pipeline), it is first determined which region(s) of the frame buffer the primitive is to be rendered for.

For example, this may be done by intersecting the primitive with the frame buffer regions and determining that the primitive should be rendered for any regions that are at least partially covered by the primitive. As part of this, the coverage of the primitive is determined (step 90), e.g. by calculating how many regions of the render output are covered by the primitive.

It is then determined whether the primitive coverage is greater than a threshold coverage (step 91). If the primitive coverage is greater than the threshold, the primitive data is then passed to a suitable external hierarchy binning circuit, and then written into a combined data structure 44 that is allocated for the entire render output (step 92).

On the other hand, where the primitive coverage does not exceed the threshold, the primitive data is then passed to a suitable primitive binning circuit and written into the respective data structures 42 for each different region for which it has been determined that the primitive is to be rendered for (step 93).

Figure 8:
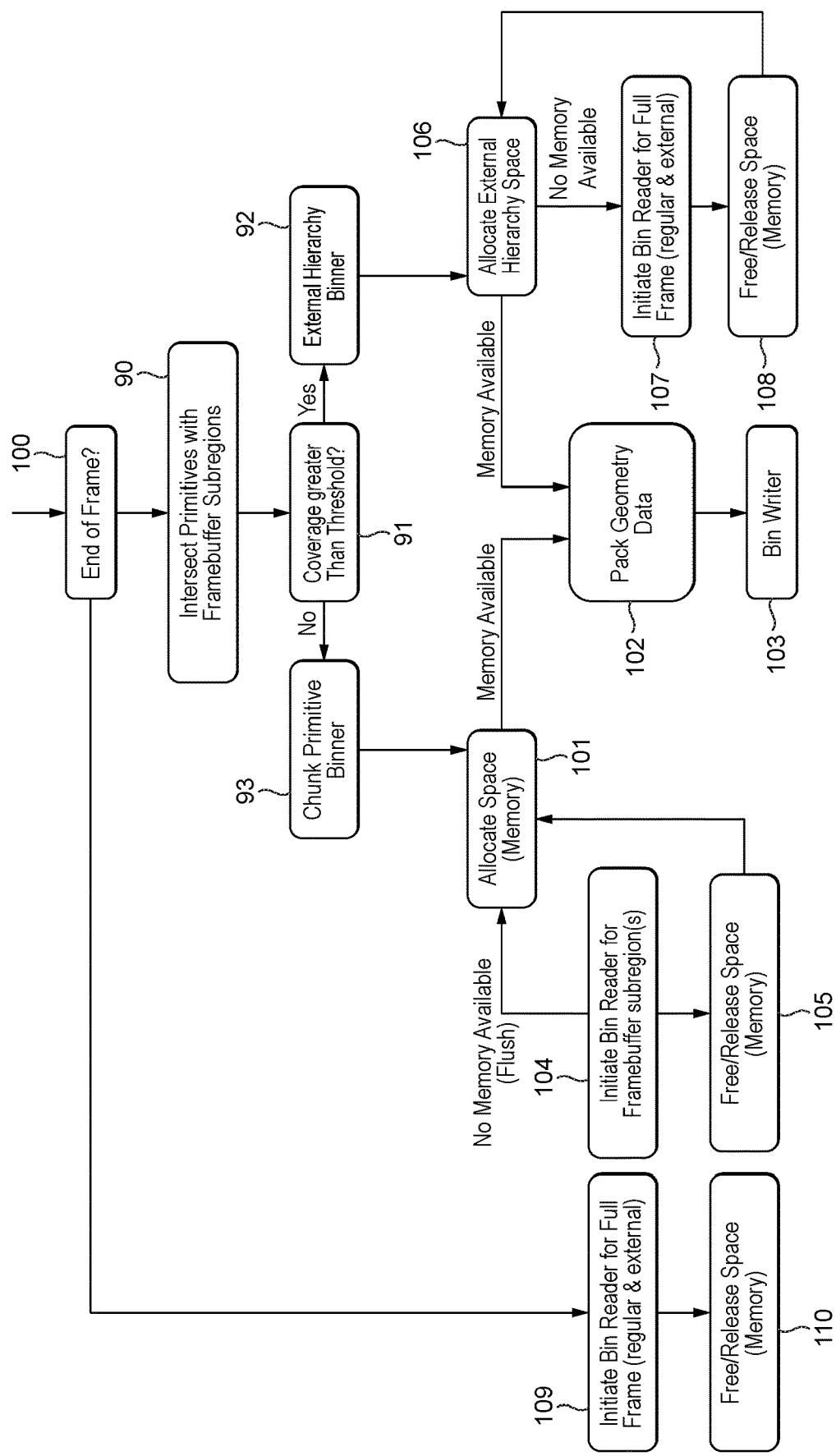
FIG. 8 is a flow chart showing in more detail the processing of primitive data according to an embodiment.

FIG. 8 shows in more detail how primitive data may be processed and stored according to an embodiment.

When a primitive is received to be processed, and the end of the render output (e.g. frame) has not yet been reached (step 100—'No'), in the same manner described above, the primitive is first intersected with the render output region (step 90) to determine whether the coverage is greater than the threshold (step 91).

If the coverage is less than the threshold (step 91—'No') the primitive data is then passed to a suitable primitive binning circuit and an attempt is made to write the primitive data into the respective data structures 42 for each different region for which it has been determined that the primitive is to be rendered for (step 93).

The primitive binning circuit thus attempts to allocate memory space for the primitive data (step 101). If memory space is available (step 101—'Yes'), the geometry data is then packed accordingly (step 102), and written into the respective data structures 42 for the different regions (step 103).

On the other hand, if there is no memory space available (step 101—'No'), one or more sub-regions for which data is currently stored are selected to be flushed, and the bin reader initiated to read out the associated data for those regions (step 104). Once the data stored in those regions has been used, the data structures can then be freed to be released to allow new primitive data to be written (step 105).

It is expected that most primitives will have a coverage less than the threshold, and will therefore be processed in this way, with the associated primitive data being stored in (and duplicated for) respective data structures 42 for each region of the render output the primitive should be rendered for.

However, for larger (e.g. "full screen") primitives, where the coverage is greater than the threshold (step 91—'Yes') the associated primitive data is instead passed to the external hierarchy binning circuit (step 92) and an attempt to allocate memory space in the global data structure 44 is made (step 94).

So long as there is available memory space in the global data structure 44 the primitive data is then packed accordingly (step 102) and written into the global data structure 44 in a hierarchical fashion (step 103).

On the other hand, if there is no available space in the global data structure 44, the bin reader is then initiated for the entire render output (step 103) in order to flush all of the data structures currently stored in memory (step 108). This ensures that any primitive data that is currently stored whether in the "per region" or global data structures can be used accordingly and rendered in the correct primitive draw order, as will be explained further below.

Similarly, at the end of the frame, when there are no new primitives to be processed (step 100—'Yes'), the bin reader is initiated to flush out all of the remaining stored data that has not yet been used (step 109) in order to free up the memory space (step 110).

Any data that is read out is then passed to a suitable primitive set up/rasterisation circuit 86, and then onto a pixel shader 87, as appropriate, before being blended and written out into the frame buffer by a suitable blending and pixel write out stage 88.

It will be appreciated that primitive data for a particular region may be stored in both the respective data structure 42 for that region and the global data structure 44. When rendering that region, it is thus necessary to check both data structures. In order to maintain the desired primitive draw order, a sequence ID (e.g. in the form of a time-stamp) is thus stored alongside the primitive data in both of the data structures. The sequence ID can then be checked in order to ensure the primitives are written out correctly.

Figure 9:
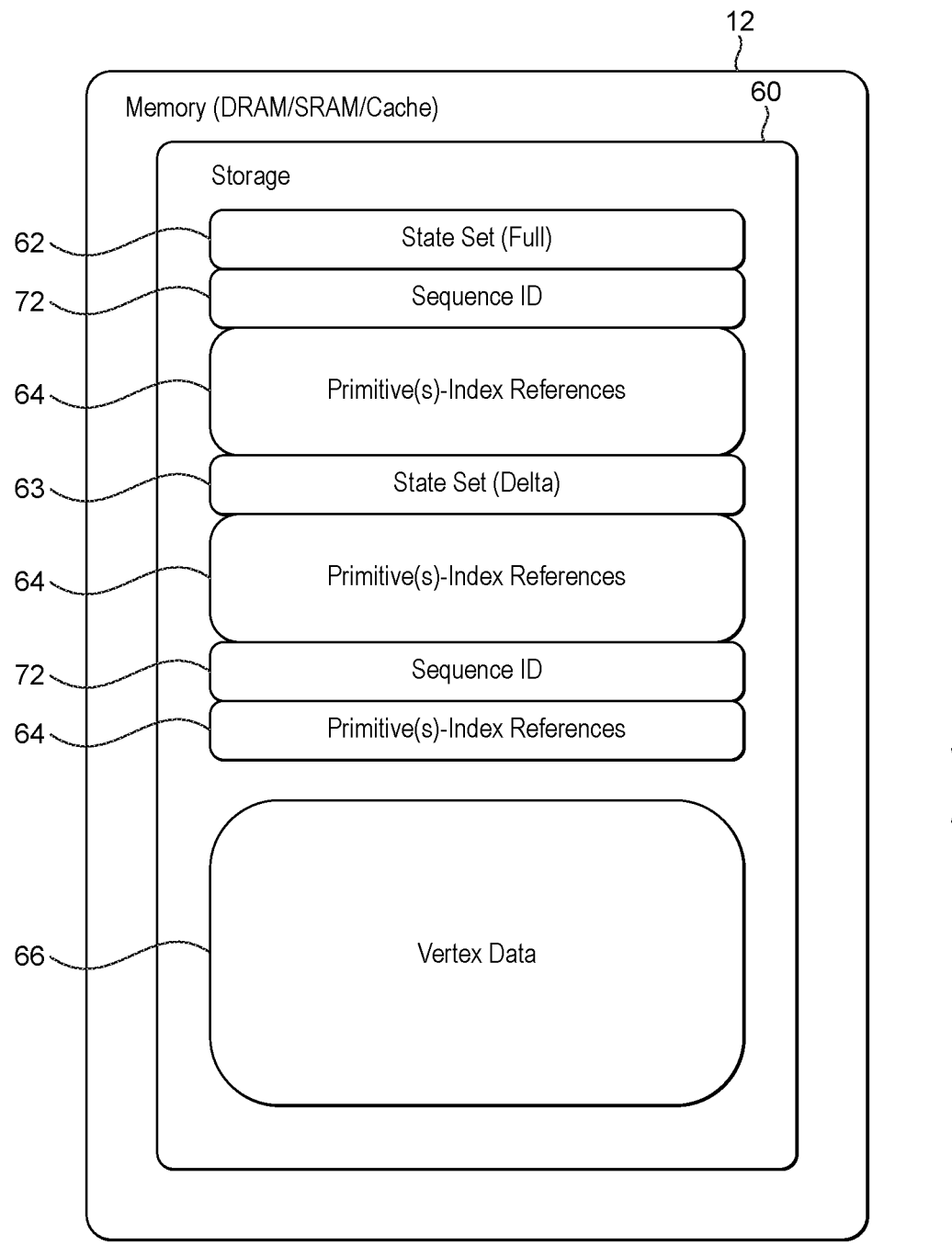
FIG. 9 shows an example of a data structure according to an embodiment.

FIG. 9 shows an example of a data structure 60 for a render output region according to the present embodiments. The data structure 60 comprises an in-order list of the state data and geometry data for any primitives for which it has been determined that the primitive should be rendered for the render output region associated with the data structure 60.

In particular, the state data (which may be defined per draw call, for example) is stored in an interspersed manner with the primitive vertex index references in a first region of the data structure 60 that grows down from the top of the data structure (i.e. the first available memory position). Thus, the full state set 62 for a first draw call for the render output region is stored, followed by the appropriate vertex index references for the primitives that that state applies to (e.g. for the draw call in question). The state set 63 for the next draw call (e.g.) is then added followed by the appropriate vertex index references 64 for the primitives that use that state data, and so on. The vertex data 66 itself (e.g. transformed vertex positions, etc.) is stored in a second region of the data structure 60 that grows upwardly from the bottom of the data structure.

In embodiments the data structure comprises a set of linked 'chunks' of memory space. In that case, each chunk of memory space may have a similar structure as shown in FIG. 9, and a link to the next chunk may also be included.

Along with the data for each primitive there is stored a sequence ID 72, e.g. in the form of a time stamp, that allows the primitive draw order to be maintained even when primitives are read out from different data structures.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of processing graphics primitives using a graphics processing system comprising a memory system and a graphics processor in communication with the memory system, wherein the graphics processor is configured to generate a render output by rendering a plurality of primitives for the render output, wherein primitives are rendered by the graphics processor using associated primitive data for the primitives, and wherein the render output is divided into a plurality of regions for rendering, each region comprising a respective area of the render output, the method comprising:

for a set of one or more primitive(s) that is to be rendered:
(i) determining for which of the plurality of regions into which the render output has been divided for rendering the set of one or more primitive(s) should be rendered for; and
(ii) in dependence on a property of the set of one or more primitive(s) wherein the property is reflective of a render output coverage of the primitive(s), either storing associated primitive data for rendering the set of one or more primitive(s) in a combined data structure in memory that is associated with a plurality of different regions of the plurality of regions into which the render output has been divided for rendering, or storing the associated primitive data for rendering the set of one or more primitive(s) in a respective data structure for each region of the render output it is determined the set of one or more primitive(s) should be rendered for;

the method further comprising:

repeating steps (i) and (ii) for plural sets of primitive(s) to be rendered, wherein the associated primitive data for rendering at least one set of one or more primitive(s) is stored in respective data structures for each different region of the render output that it is determined the set of primitive(s) should be rendered for whereas the associated primitive data for rendering at least one other set of primitive(s) is stored in the combined data structure.

2. The method of claim 1, wherein the property of the set of one or more primitive(s) is reflective of a render output coverage of the primitive(s).

3. The method of claim 2, further comprising:
calculating the number of regions of the render output it is determined that the primitive should be rendered for;
determining whether the number of regions of the render output it is determined that the primitive should be rendered for is greater than a threshold number of regions of the render output; and
in dependence on determining that the number of regions of the render output the primitive should be rendered for is greater than the threshold number of regions of the render output, storing primitive data for rendering the primitive in the combined data structure in memory associated with the plurality of different regions of the plurality of regions into which the render output has been divided for rendering,
whereas when it is determined that the number of regions of the render output the primitive should be rendered for is fewer than or equal to the threshold number of regions of the render output, rather than storing the primitive data in the combined data structure that is allocated for the entire render output, storing primitive data for rendering the primitive in a different respective data structure in memory for each different region of the render output the primitive should be rendered for.

4. The method of claim 1, wherein the associated primitive data for the set of one or more primitive(s) includes geometry data representing the primitive(s) and/or an indication of state data indicative of operations to be performed when rendering the primitive(s).

5. The method of claim 1, wherein when it is desired to use primitive data in order to render a region of the render output, the method comprises reading out primitive data for use by the graphics processor for rendering that region from the respective data structure for the region and/or from the combined data structure.

6. The method of claim 5, wherein the primitive data is associated with data indicative of the primitive draw order and wherein when primitive data is being read out for use by the graphics processor, the method comprises checking the data indicative of the primitive draw order, and rendering the primitives in the desired primitive draw order.

7. The method of claim 6, wherein the data indicative of the primitive draw order comprises a time-stamp, and wherein the time-stamp is stored in the data structure along with the associated primitive data.

8. The method of claim 1, comprising: when it is determined that new primitive data for a primitive should be stored in one or more data structure(s) in memory associated with a corresponding one or more region(s) of the render output, determining whether there is less than a threshold of available space in the memory, and when there is less than the threshold of available space in the memory: selecting one or more region(s) for which a data structure already exists in memory to be flushed from memory; reading the data out from the data structure(s) for the selected region(s) for use by the graphics processor; and then discarding the data structure(s) for the selected region(s) from memory to free up memory space, but not flushing the combined data structure associated with the plurality of regions.

9. The method of claim 1, comprising flushing all of the data structures, including the combined data structure, from memory at the end of the render output.

10. The method of claim 1, wherein primitive data is stored in the combined data structure in a hierarchical fashion.

11. A graphics processing system comprising a memory system and a graphics processor in communication with the memory system, wherein the graphics processor is configured to generate a render output by rendering a plurality of primitives for the render output, wherein primitives are rendered by the graphics processor using associated primitive data for the primitives, and wherein the render output is divided into a plurality of regions for rendering, each region comprising a respective area of the render output, the graphics processor comprising:

a primitive sorting circuit that is configured to:

for a set of one or more primitive(s) that is to be rendered:

(i) determine for which of the plurality of regions into which the render output has been divided for rendering the set of one or more primitive(s) should be rendered for; and a primitive storing circuit that is configured to:

(ii) in dependence on a property of the set of one or more primitive(s), wherein the property is reflective of a render output coverage of the primitive(s), either store associated primitive data for rendering the set of one or more primitive(s) in a combined data structure in memory that is associated with a plurality of regions of the plurality of regions into which the render output has been divided for rendering, or store the associated primitive data for rendering the set of one or more primitive(s) in a respective data structure for each region of the render output it is determined the set of one or more primitive(s) should be rendered for;

the primitive sorting circuit and the primitive storing circuit are configured to repeat (i) and (ii) for plural sets of primitive(s) to be rendered, wherein the associated primitive data for rendering at least one set of one or more primitive(s) is stored in respective data structures for each different region of the render output that it is determined the set of primitive(s) should be rendered for whereas the associated primitive data for rendering at least one other set of primitive(s) is stored in the combined data structure.

12. The system of claim 11, wherein the property of the set of one or more primitive(s) is reflective of a render output coverage of the primitive(s).

13. The system of claim 12, wherein the primitive storing circuit is further configured to:

calculate the number of regions of the render output it is determined that the primitive should be rendered for;

determine whether the number of regions of the render output it is determined that the primitive should be rendered for is greater than a threshold number of regions of the render output; and in dependence on determining that the number of regions of the render output the primitive should be rendered for is greater than the threshold number of regions of the render output, store primitive data for rendering the primitive in the combined data structure in memory associated with the plurality of different regions of the plurality of regions into which the render output has been divided for rendering, whereas when it is determined that the number of regions of the render output the primitive should be rendered for is fewer than or equal to the threshold number of regions of the render output, rather than storing the primitive data in the combined data structure that is allocated for the entire render output, store primitive data for rendering the primitive in a different respective data structure in memory for each different region of the render output the primitive should be rendered for.

14. The system claim 11, wherein the associated primitive data for the set of one or more primitive(s) includes geometry data representing the primitive(s) and/or an indication of state data indicative of operations to be performed when rendering the primitive(s).

15. The system of claim 11, wherein when it is desired to use primitive data in order to render a region of the render output, a read-out circuit is configured to read out primitive data for use by the graphics processor for rendering that region from the respective data structure for the region and/or from the combined data structure.

16. The system of claim 15, wherein the primitive data is associated with data indicative of the primitive draw order and wherein when primitive data is being read out for use by the graphics processor, the read-out circuit is configured to check the data indicative of the primitive draw order, and render the primitives in the desired primitive draw order.

17. The system of claim 16, wherein the data indicative of the primitive draw order comprises a time-stamp, and wherein the time-stamp is stored in the data structure along with the associated primitive data.

18. The system of claim 11, wherein when it is determined that new primitive data for a primitive should be stored in one or more data structure(s) in memory associated with a corresponding one or more region(s) of the render output, the read-out circuit is configured to determine whether there is less than a threshold of available space in the memory, and when there is less than the threshold of available space in the memory: select one or more region(s) for which a data structure already exists in memory to be flushed from memory; read the data out from the data structure(s) for the selected region(s) for use by the graphics processor; and then discard the data structure(s) for the selected region(s) from memory to free up memory space, but not flush the combined data structure associated with the plurality of regions.

19. The system of claim 11, wherein the read-out circuit is configured to flush all of the data structures, including the combined data structure, from memory at the end of the render output.

20. The system of claim 11, wherein primitive data is stored in the combined data structure in a hierarchical fashion.

21. A non-transitory computer readable storage medium storing software code that when executing on a data processor performs a method of processing graphics primitives using a graphics processing system comprising a memory system and a graphics processor in communication with the memory system, wherein the graphics processor is configured to generate a render output by rendering a plurality of primitives for the render output, wherein primitives are rendered by the graphics processor using associated primitive data for the primitives, and wherein the render output is divided into a plurality of regions for rendering, each region comprising a respective area of the render output, the method comprising:

for a set of one or more primitive(s) that is to be rendered:

determining for which of the plurality of regions into which the render output has been divided for rendering the set of one or more primitive(s) should be rendered for; and in dependence on a property of the set of one or more primitive(s), wherein the property is reflective of a render output coverage of the primitive(s), either storing associated primitive data for rendering the set of one or more primitive(s) in a combined data structure in memory that is associated with a plurality of different regions of the plurality of regions into which the render output has been divided for rendering, or storing the associated primitive data for rendering the set of one or more primitive(s) in a respective data structure for each region of the render output it is determined the set of one or more primitive(s) should be rendered for the method further comprising:

repeating steps (i) and (ii) for plural sets of primitive(s) to be rendered, wherein the associated primitive data for rendering at least one set of one or more primitive(s) is stored in respective data structures for each different region of the render output that it is determined the set of primitive(s) should be rendered for whereas the associated primitive data for rendering at least one other set of primitive(s) is stored in the combined data structure.

* * * * *

UNITED STATES PATENT AND TRADEMARK OFFICE
CERTIFICATE OF CORRECTION

| | |
|---|---|
| PATENT NO. | : 11,216,993 B2 |
| APPLICATION NO. | : 16/697903 |
| DATED | : January 4, 2022 |
| INVENTOR(S) | : Chalfin et al. |

It is certified that error appears in the above-identified patent and that said Letters Patent is hereby corrected as shown below:

In the Claims

Column 32, Line 64 (Claim 21, Line 30): please replace "for the" with -- for; the --

Signed and Sealed this
Twenty-sixth Day of April, 2022

Katherine Kelly Vidal
*Director of the United States Patent and Trademark Office*